(12) United States Patent
Namekawa et al.

(10) Patent No.: US 8,848,492 B2
(45) Date of Patent: Sep. 30, 2014

(54) ELECTRONIC WATCH

(75) Inventors: Masaaki Namekawa, Kiyose (JP); Yu Takyo, Nishitokyo (JP)

(73) Assignees: Citizen Holdings Co., Ltd., Tokyo (JP); Citizen Watch Co., Ltd, Tokyo (JP)

( * ) Notice: Subject to any disclaimer, the term of this patent is extended or adjusted under 35 U.S.C. 154(b) by 52 days.

(21) Appl. No.: 13/578,929

(22) PCT Filed: Feb. 9, 2011

(86) PCT No.: PCT/JP2011/052786
§ 371 (c)(1),
(2), (4) Date: Aug. 14, 2012

(87) PCT Pub. No.: WO2011/099536
PCT Pub. Date: Aug. 18, 2011

(65) Prior Publication Data
US 2012/0307602 A1    Dec. 6, 2012

(30) Foreign Application Priority Data
Feb. 15, 2010 (JP) .................. 2010-029909

(51) Int. Cl.
*H02P 8/00* (2006.01)
*G04C 3/14* (2006.01)
*G04G 19/10* (2006.01)
*H02P 8/02* (2006.01)

(52) U.S. Cl.
CPC *H02P 8/02* (2013.01); *G04C 3/143* (2013.01); *G04G 19/10* (2013.01)
USPC ............................................ 368/80; 318/696

(58) Field of Classification Search
USPC ............... 368/80, 157, 160, 204; 318/696
See application file for complete search history.

(56) References Cited

U.S. PATENT DOCUMENTS

| 4,467,255 | A  | * | 8/1984  | Tu Xuan ....................... 318/696 |
| 6,154,422 | A  |   | 11/2000 | Shinkawa et al. |
| 6,262,554 | B1 | * | 7/2001  | Kojima et al. ................ 318/685 |
| 2004/0232874 | A1 |   | 11/2004 | Fukamizu et al. |

FOREIGN PATENT DOCUMENTS

| JP | 53-81268    | A  | 7/1978 |
| JP | 8-33457     | B  | 3/1996 |
| JP | 2003-130972 | A  | 5/2003 |
| JP | 2004-274880 | A  | 9/2004 |
| JP | 3653850     | B  | 6/2005 |
| WO | 00/77581    | A1 | 12/2000 |

* cited by examiner

*Primary Examiner* — Sean Kayes
(74) *Attorney, Agent, or Firm* — Sughrue Mion, PLLC

(57) ABSTRACT

When recovering power from a motor driver, a forward voltage across a parasitic diode can reduce the recovery efficiency, and control of a power recovery operation can take an unnecessarily long time. In order to address this problem, the power recovery operation is performed as follows without being affected by a parasitic diode: near a peak position of a waveform of an induced current resulting from free oscillation of a rotor after a drive pulse is output, a recovery pulse having such a level that the rotor does not rotate is output from a terminal different from a motor driver terminal to which the drive pulse was output. Also, by adjusting the width and output timing of the recovery pulse based on a power supply voltage, the power recovery can be optimized for the power supply voltage.

5 Claims, 17 Drawing Sheets

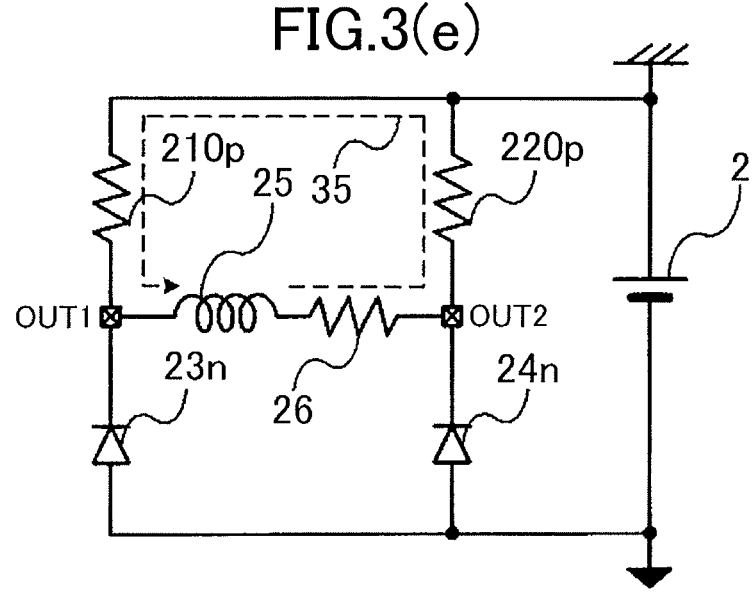
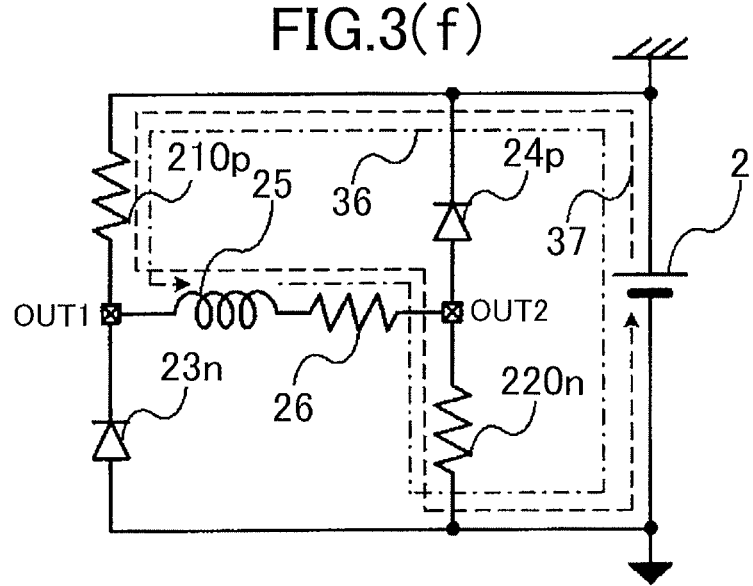

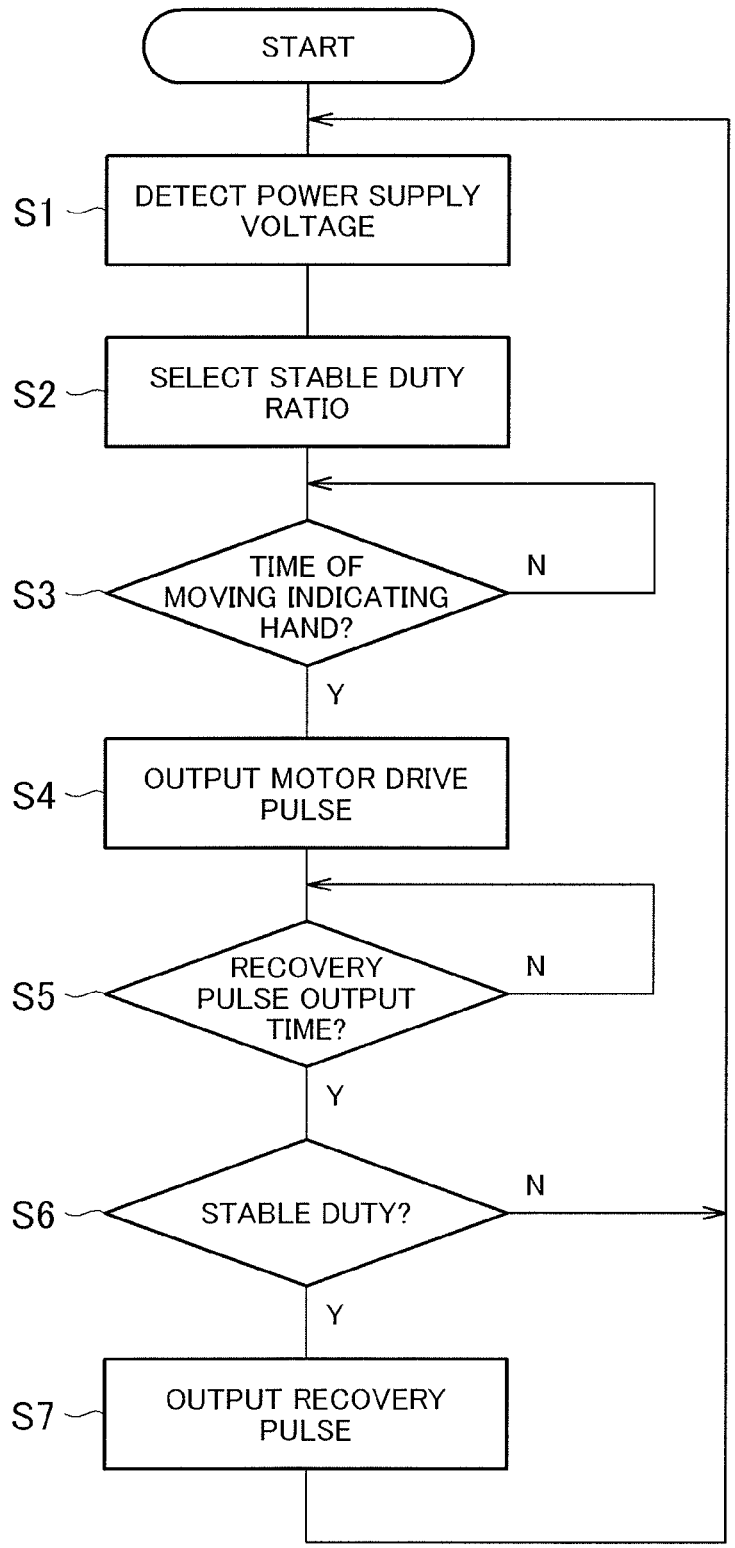

ELECTRONIC WATCH

CROSS REFERENCE TO RELATED APPLICATIONS

This application is a National Stage of International Application No. PCT/JP2011/052786 filed on Feb. 9, 2011, which claims priority from Japanese Patent Application No. 2010-029909, filed on Feb. 15, 2010, the contents of all of which are incorporated herein by reference in their entirety.

TECHNICAL FIELD

The present invention relates to a method of controlling a stepper motor and to an electronic watch including a stepper motor, and more particularly, to a control method for recovering electric power in order to reduce driving power for a stepper motor, and to an electronic watch using the control method.

BACKGROUND ART

Conventionally, an electronic watch such as a wristwatch includes a stepper motor for driving an indicating hand, and such a hand, e.g., the second hand or the like, is moved based on a drive pulse generated by a reference signal from an oscillation circuit using a crystal oscillator or the like. Note that in the following, members to be driven by the stepper motor in the electronic watch, such as the indicating hand, are collectively referred to as indicators.

In recent years, many such kinds of electronic watch have been commercially available, which use a combination of a power generation system such as a solar battery and a rechargeable secondary battery such as a lithium-ion battery and are therefore free from battery disposal and battery replacement.

Those electronic watches have limited types of mountable power source in order to realize the reduction in size and thickness. It is therefore necessary to reduce power consumption of the stepper motor and the like as much as possible in order to perform a stable operation for a long time.

In light of this, there has been conventionally proposed an electronic watch including control means for reducing power consumption by recovering part of electric power used for driving the stepper motor (see, for example, Patent Literature 1). Hereinafter, an electronic watch including conventional power recovery control means is described with reference to the drawings.

FIG. 8(a) is a block diagram illustrating a configuration of the electronic watch including the conventional power recovery control means disclosed in Patent Literature 1. Reference symbol 11a denotes a motor control circuit including an oscillation circuit 111, a clock division circuit 112, and a drive pulse output circuit 113. In the motor control circuit 11a, the frequency of a reference signal generated by the oscillation circuit 111 is divided by the clock division circuit 112 to generate various timing signals, and the drive pulse output circuit 113 outputs a drive pulse S1 in response to the timing signals. Reference numeral 3 denotes a motor driver, which receives the drive pulse S1 as its input and outputs a drive pulse S2. Reference numeral 4 denotes a stepper motor for moving an indicating hand 5 based on the drive pulse S2. Reference symbol 1a denotes a clock circuit formed of the motor control circuit 11a and the motor driver 3. The clock circuit 1a obtains operating energy from a power source 2 formed of a secondary battery such as a lithium-ion battery.

FIG. 8(b) is an equivalent circuit diagram illustrating a configuration of the motor driver 3. Reference symbol 21p denotes a PMOS transistor having a gate to which a control signal φp1 is input, a source connected to the positive side of the power source 2, and a drain side connected to an OUT1 terminal. Reference symbol 21n denotes an NMOS transistor having a gate to which a control signal φn1 is input, a source connected to the negative side of the power source 2, and a drain side connected to the OUT1 terminal. Parasitic diodes 23p and 23n, which are generated because of the MOS transistor structure, are connected between the respective sources and drains. Reference symbol 22p denotes a PMOS transistor having a gate to which a control signal φp2 is input, a source connected to the positive side of the power source 2, and a drain side connected to an OUT2 terminal. Reference symbol 22n denotes an NMOS transistor having a gate to which a control signal φn2 is input, a source connected to the negative side of the power source 2, and a drain side connected to the OUT2 terminal. Parasitic diodes 24p and 24n, which are generated because of the MOS transistor structure, are connected between the respective sources and drains. A coil 25 and a series resistance component 26 of the coil 25, which constitute the stepper motor 4, are connected in series between the OUT1 terminal and the OUT2 terminal. Note that the control signals φp1, φn1, φp2, and φn2 to be input to the respective gates of the MOS transistors 21p, 21n, 22p, and 22n are signals constituting the drive pulse S1.

FIG. 8(c) shows a timing chart of waveforms of the control signals φp1, φn1, φp2, and φn2, waveforms of signals at the OUT1 terminal and the OUT2 terminal, and a waveform of a current flowing through the coil 25. Hereinafter, the operation of the motor driver 3 of the electronic watch including the conventional power recovery control means illustrated in FIG. 8(b) is described with reference to the timing chart. Normally (before time t0), the control signals φp1, φn1, φp2, and φn2 are held to Low level, and hence the PMOS transistors 21p and 22p are turned ON and the NMOS transistors 21n and 22n are turned OFF. Accordingly, the OUT1 terminal and the OUT2 terminal both have the same potential GND(+), and hence no current flows through the coil 25.

At time t0, the control signals φp1 and φn1 become High level, and hence the PMOS transistor 21p is turned OFF and the NMOS transistor 21n is turned ON. Accordingly, the OUT1 terminal becomes Low level and the OUT2 terminal becomes High level, and hence a current flows through the coil 25. That is, a rotor (not shown) constituting the stepper motor 4 rotates based on a magnetic field generated by the coil 25. When the control signals φp1 and φn1 become Low level at time t1, the OUT1 terminal and the OUT2 terminal both have the same potential GND(+), and hence the current supply to the coil 25 is interrupted. However, an induced current is generated because the rotor rotates by inertia. The rotor rotates toward a predetermined stop position, and then a magnetic flux passing through the coil 25, which is generated by the rotor, changes because of free oscillation of the rotor. The direction of the induced current flowing through the coil 25 also changes in accordance with the direction of the change of the magnetic flux.

At time t2, the control signals φp1 and φp2 are set to High level. The PMOS transistors 21p and 22p are turned OFF, and hence no induced current flows through the coil 25. Due to this abrupt change in current, a large counter-electromotive force is generated in the coil 25. When the counter-electromotive voltage at this time becomes higher than the voltage of the power source 2, a current flows from the coil 25 to the power source 2 via the parasitic diodes 23p, 23n, 24p, and 24n provided so as to connect the coil 25 and the power source 2 to each other. In this way, the power source 2 is charged.

Next, at time t3, the control signals φp1 and φn1 become Low level. The PMOS transistors 21p and 22p are turned ON, and hence an induced current flows through the coil 25. Due to this abrupt change in current, a counter-electromotive force having a polarity opposite to that of the counter-electromotive force at time t2 is generated in the coil 25. When the counter-electromotive voltage at this time becomes higher than the voltage of the power source 2, the power source 2 is charged similarly to the case at time t2. Such operation is repeatedly performed, for example, until time t4 while the rotor is generating induced electric power in the coil 25. In this way, part of electric power used for driving the stepper motor 4 can be recovered.

At time t4, the control signals φp1, φn1, φp2, and φn2 become Low level, and hence the PMOS transistors 21p and 22p are turned ON and the NMOS transistors 21n and 22n are turned OFF. Accordingly, the OUT1 terminal and the OUT2 terminal both have the same potential GND(+) and the free oscillation of the rotor is stopped, and hence no current flows through the coil 25.

Next, at time t5, the control signals φp2 and φn2 become High level, and hence the PMOS transistor 22p and the NMOS transistor 21n are turned OFF and the PMOS transistor 21p and the NMOS transistor 22n are turned ON. Accordingly, the OUT1 terminal becomes High level and the OUT2 terminal becomes Low level, and hence a current flows through the coil 25 in the direction opposite to the case at time t0. After that, the power recovery operation is performed from time t6 similarly to the above.

By the way, in the stepper motor used for an electronic watch, rotation detection may be performed to detect whether or not the rotor has rotated normally. As described in Patent Literature 2, the rotation detection is performed in such a manner that a drive pulse being an output for rotating the rotor is output and then the current waveform of an induced current resulting from inertial rotation of the rotor is detected. When it is continuously detected for a given period that the rotor has rotated normally, the output of the drive pulse is decreased to reduce power consumption. When the rotor has not rotated, a correction pulse for rotating the rotor is output to rotate the rotor reliably so as to prevent a delay of the electronic watch, and the output of the drive pulse is increased so that the rotor may rotate reliably in the next and subsequent operations.

On this occasion, the output level of the drive pulse is expressed by a ratio of the period during which the drive pulse is actually output to the period during which the drive pulse can be output, and is called duty ratio. In the case where the above-mentioned control is performed in an electronic watch, the lowest duty ratio needed to rotate the rotor normally is automatically selected and output.

CITATION LIST

Patent Literature

[Patent Literature 1] JP 3653850 B
[Patent Literature 2] JP 08-33457 B

SUMMARY OF INVENTION

Technical Problem

However, in the above-mentioned technology described in Patent Literature 1, the power source 2 cannot be charged from the coil 25 unless the counter-electromotive voltage of the coil 25 generated by turning ON/OFF the PMOS transistors 21p and 22p becomes higher than the voltage of the power source 2 by two-stage forward voltages (about 1 V) of the parasitic diodes 23p and 24n or two-stage forward voltages (about 1 V) of the parasitic diodes 24p and 23n. Therefore, recovery efficiency may be excessively low. In addition, even when the counter-electromotive voltage generated in the coil 25 is lower than a recoverable voltage level, the PMOS transistors 21p and 22p are continuously operated to be turned ON/OFF. This is wasteful of time.

Further, in the power recovery operation described in Patent Literature 1, the power supply voltage is superimposed on the coil of the motor, and kinetic energy of the rotor rotating by inertia is recovered as electric power. This operation therefore acts as a brake on the rotor. Thus, when the power recovery operation is performed, the value of a current obtainable from the coil is changed because the power supply voltage is superimposed thereon, and the current waveform of an induced current generated by the rotor rotating by inertia is changed. Therefore, there is a fear of an erroneous detection in the rotation detection. However, in Patent Literature 1, the rotation detection is not taken into account at all.

It is an object of the present invention to solve the above-mentioned problems and provide a system capable of recovering electric power more efficiently with an economical operation.

It is another object of the present invention to provide a system capable of recovering electric power without causing an erroneous detection in rotation detection.

Solution to Problem

In order to solve the above-mentioned problems, an electronic watch including control means for recovering electric power according to the present invention employs the following configurations.

An electronic watch having a configuration including: a power source; a stepper motor for driving an indicator; a motor driver for driving the stepper motor; a motor control circuit for outputting a control signal for controlling the stepper motor to the motor driver; a drive pulse output circuit for outputting a drive pulse for driving the stepper motor to the motor driver; and a recovery pulse output circuit for outputting, in a vicinity of a peak position of a waveform of an induced current resulting from free oscillation of a rotor of the stepper motor after the output of the drive pulse, a recovery pulse having such a level that the rotor does not rotate, in which the motor control circuit outputs the drive pulse and the recovery pulse in a switching manner so that electric power of the induced current is regenerated into the power source when the recovery pulse is output.

With this, recovery control can be performed only at the time when induced electric power generated in the coil resulting from the rotation of the rotor can be recovered, and hence power recovery can be performed quickly and economically. In addition, electric power can be recovered but not via a parasitic diode of the motor driver, and hence power recovery can be performed efficiently.

A configuration in which the electronic watch further includes: a rotation detection pulse output circuit for outputting a rotation detection pulse used for detecting the waveform of the induced current to the stepper motor control circuit; a rotation detection circuit for determining presence or absence of rotation of the stepper motor based on the waveform of the induced current detected by the rotation detection pulse; and an adjustment circuit for controlling operations of the rotation detection pulse output circuit and the recovery pulse output circuit in order to prevent an erroneous determination on the presence or absence of the rotation performed by the rotation detection circuit.

With this, electric power can be recovered without causing an erroneous detection in the rotation detection. Examples of the more detailed configurations thereof are as follows.

A configuration in which: the rotation detection pulse output circuit outputs a first detection pulse for detecting an induced current waveform having the same polarity as a polarity of a current waveform generated by the drive pulse, and a second detection pulse for detecting an induced current waveform having a polarity opposite to the polarity of the current waveform generated by the drive pulse, the second detection pulse being output after the first detection pulse; and the adjustment circuit controls the recovery pulse output circuit so as to output the recovery pulse after the detection by the first detection pulse has been finished, and controls the rotation detection pulse output circuit so as to start outputting the second detection pulse after a predetermined period has elapsed.

A configuration in which: the rotation detection pulse output circuit outputs a preliminary detection pulse for performing preliminary detection of preliminarily detecting the presence or absence of the rotation of the stepper motor, and outputs a main detection pulse for performing main detection of detecting the presence or absence of the rotation of the stepper motor after the preliminary detection; and the adjustment circuit inhibits an output of the recovery pulse from the recovery pulse output circuit when the rotation detection circuit detects, in the preliminary detection, that the stepper motor has not rotated.

A configuration in which: the rotation detection circuit includes a sensitivity setting circuit for changing detection sensitivity with respect to the waveform of the induced current; and the adjustment circuit controls the sensitivity setting circuit so as to increase the detection sensitivity when the recovery pulse is output from the recovery pulse output circuit.

A configuration in which the adjustment circuit controls the rotation detection pulse output circuit so as to output the recovery pulse when a duty ratio of the drive pulse is equal to a stable duty ratio which is determined in advance in accordance with a power supply voltage of the power source.

With this, efficient power recovery is realized over a wide range of varying power supply voltage, and at the same time, the adverse influence caused by the output of the recovery pulse can be reduced.

Further, the present invention may include the following configurations.

A configuration in which the electronic watch further includes a power supply voltage detection circuit for detecting a voltage of the power source, and the recovery pulse output circuit controls a pulse width of the recovery pulse based on a detection result of the power supply voltage detection circuit.

A configuration in which the recovery pulse output circuit controls an output timing of the recovery pulse based on a detection result of the power supply voltage detection circuit.

Advantageous Effects of Invention

As described above, the present invention can provide a system capable of recovering electric power more efficiently with an economical operation in an electronic watch including control means for recovering electric power by a stepper motor. The present invention can also provide a system capable of recovering electric power without causing an erroneous detection in rotation detection.

BRIEF DESCRIPTION OF DRAWINGS

FIG. 3(e) An equivalent circuit diagram illustrating the state of the motor driver according to the first embodiment of the present invention, and illustrating the state immediately before t18 of FIG. 2(b).

FIG. 3(f) An equivalent circuit diagram illustrating the state of the motor driver according to the first embodiment of the present invention, and illustrating the state between t18 and t19 of FIG. 2(b).

FIG. 17 A flowchart for control of outputting a recovery pulse in the case where a duty ratio of a drive pulse is a stable duty ratio.

DESCRIPTION OF EMBODIMENTS

Figure 1:
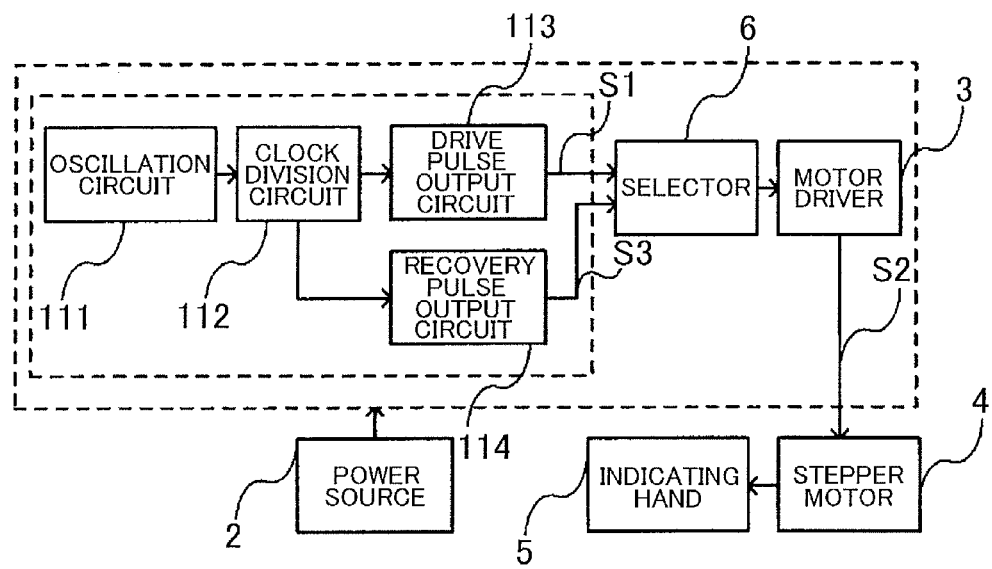
FIG. 1 A block diagram illustrating a configuration of an electronic watch including power recovery control means according to a first embodiment of the present invention.
Figure 2A:
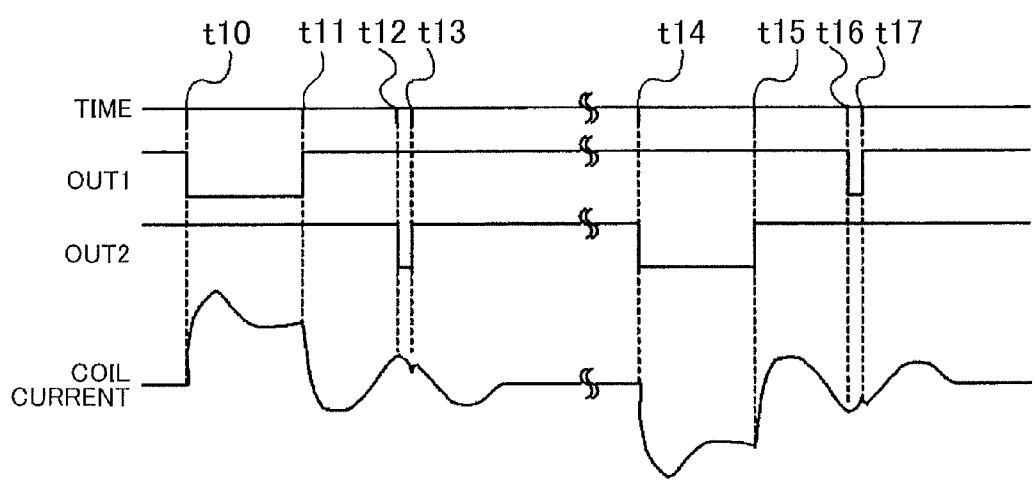
FIG. 2(a) A timing chart showing the operation of the electronic watch according to the first embodiment of the present invention.
Figure 2B:
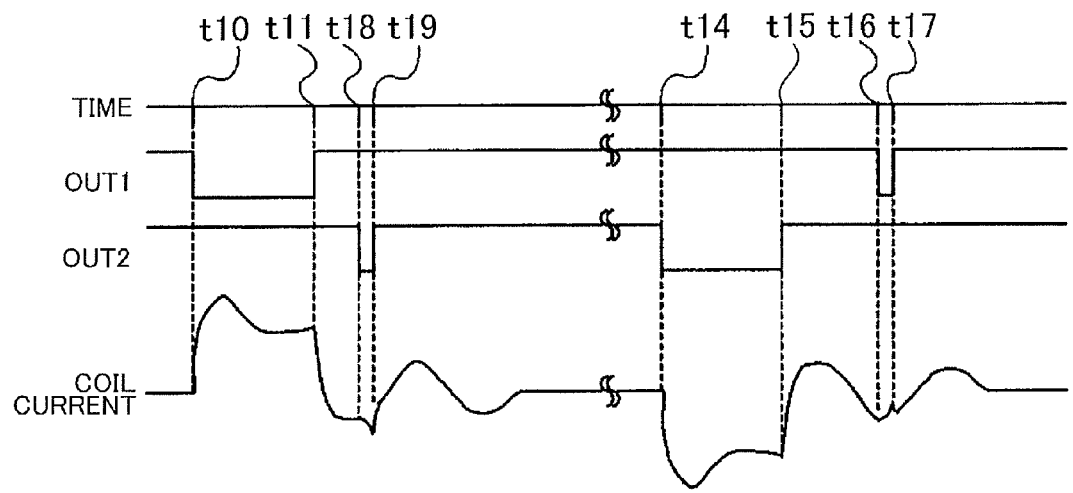
FIG. 2(b) A timing chart showing the operation of the electronic watch in the case where an output timing of a recovery pulse deviates significantly from the vicinity of the peak in the first embodiment of the present invention.
Figure 4:
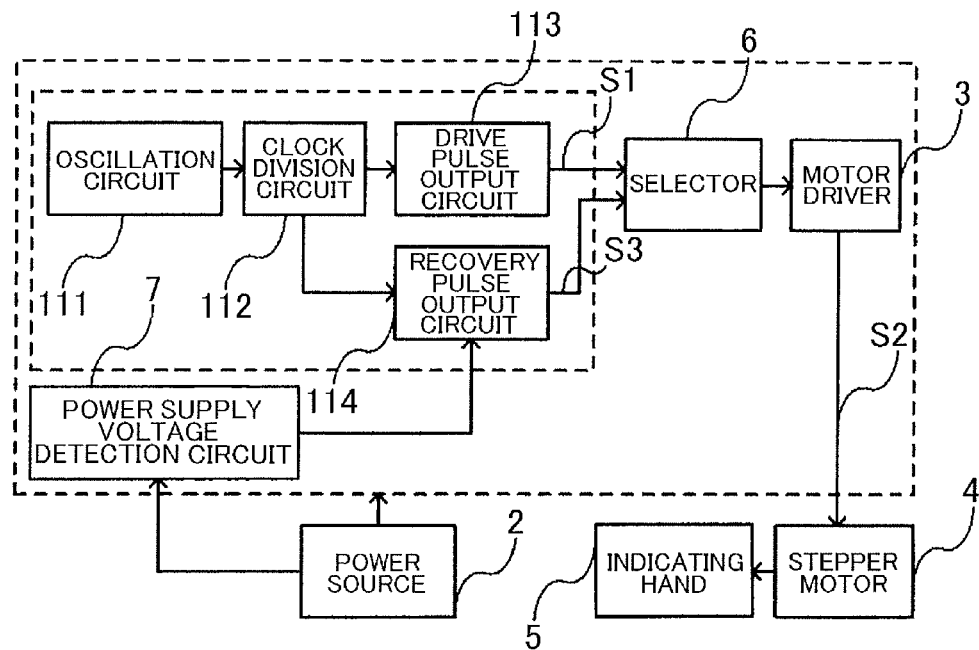
FIG. 4 A block diagram illustrating a configuration of an electronic watch including power recovery control means according to a second embodiment of the present invention.
Figure 5:
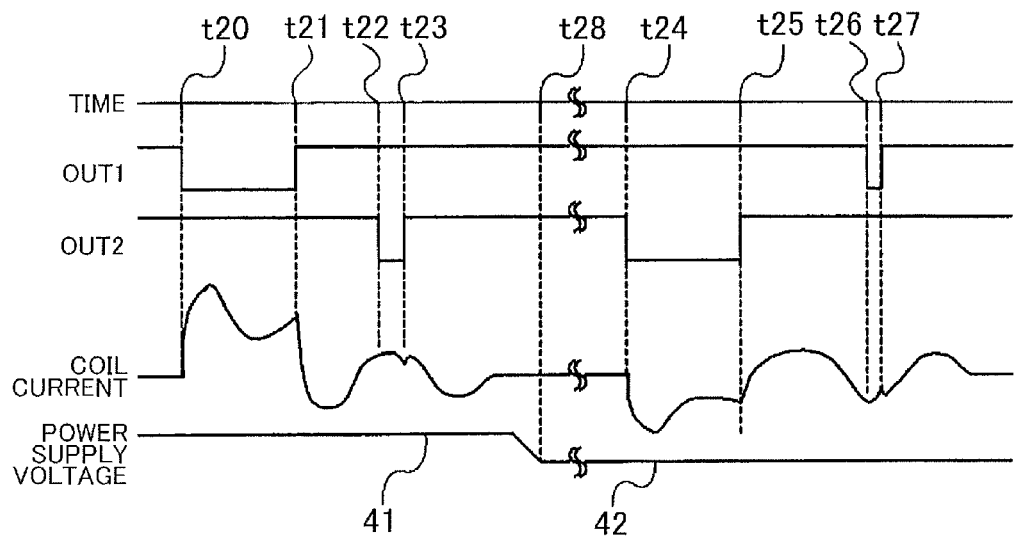
FIG. 5 A timing chart showing the operation of the electronic watch according to the second embodiment of the present invention.
Figure 6:
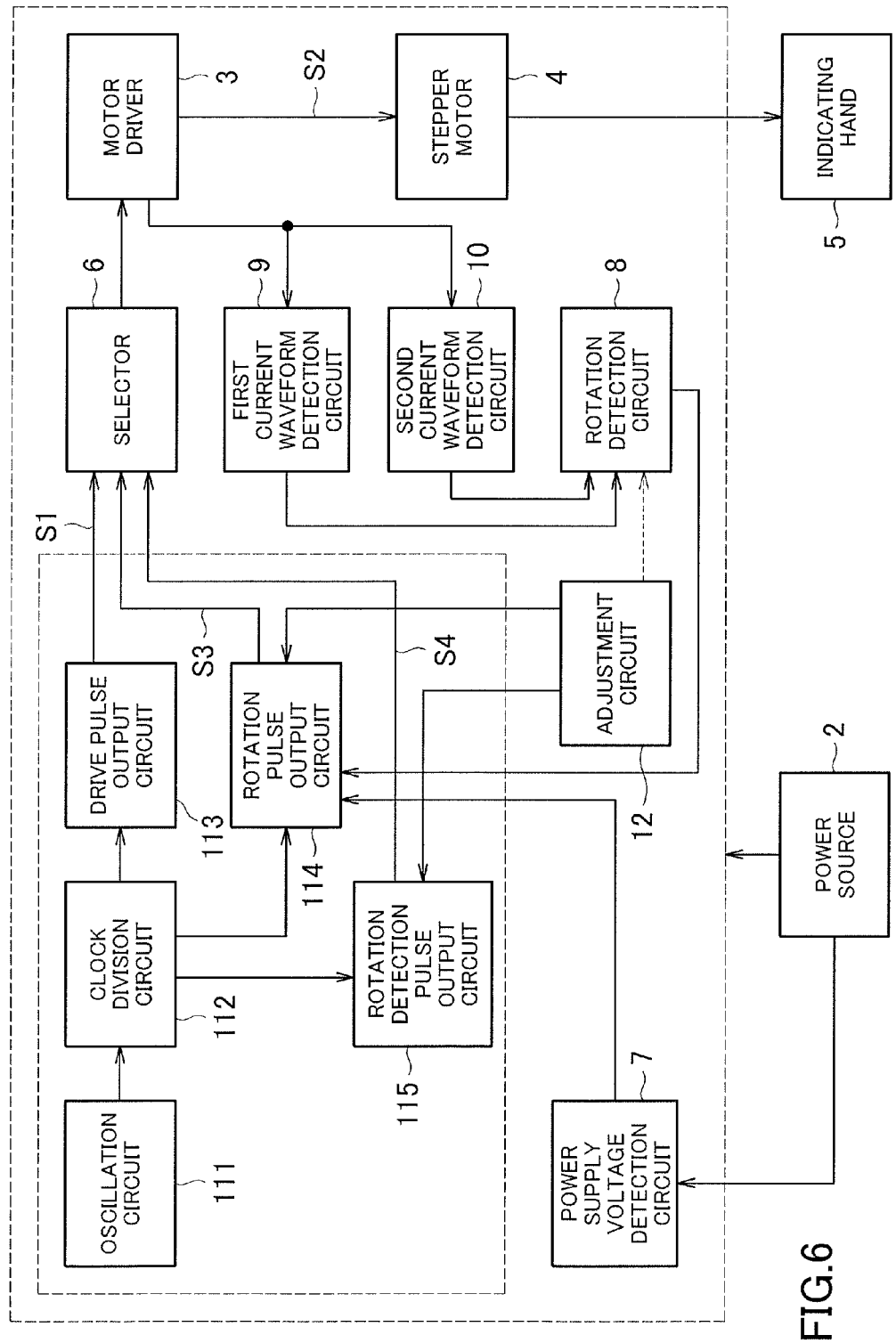
FIG. 6 A block diagram illustrating a configuration of an electronic watch including power recovery control means according to a third embodiment of the present invention.
Figure 7:
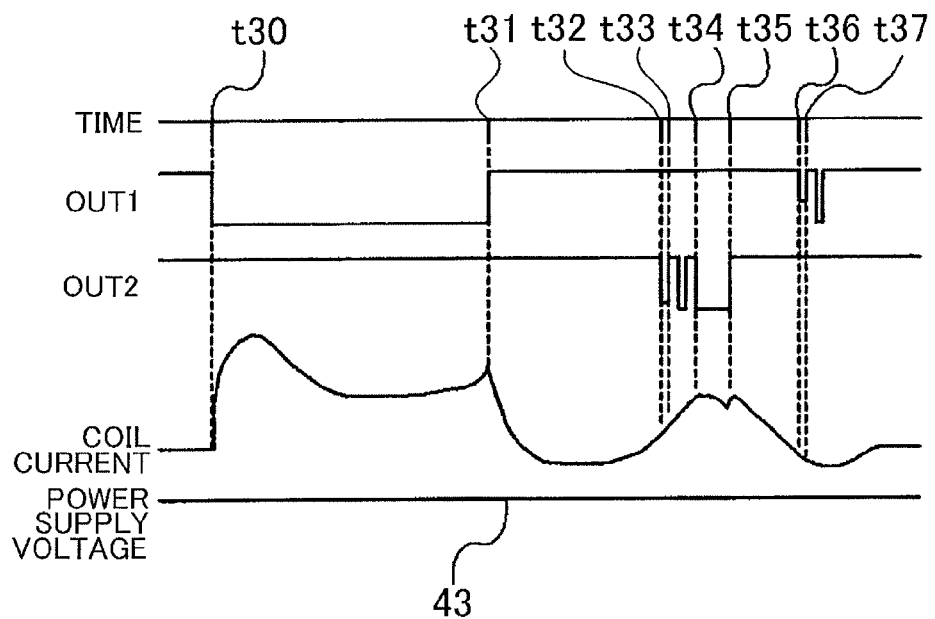
FIG. 7 A timing chart showing the operation of the electronic watch according to the third embodiment of the present invention.

Embodiments of the present invention are described below in detail with reference to the drawings. FIG. 1 is a block diagram illustrating a configuration of an electronic watch including power recovery control means according to a first embodiment of the present invention. FIGS. 2(a) and 2(b) are timing charts showing the operation of the electronic watch according to the first embodiment of the present invention. FIGS. 3(a) to 3(f) are explanatory diagrams illustrating operating states of a motor driver according to the first embodiment of the present invention. FIG. 4 is a block diagram illustrating a configuration of an electronic watch including power recovery control means according to a second embodiment of the present invention. FIG. 5 is a timing chart showing the operation of the electronic watch according to the second embodiment of the present invention. FIG. 6 is a block diagram illustrating a configuration of an electronic watch including power recovery control means according to a third embodiment of the present invention. FIG. 7 is a timing chart showing the operation of the electronic watch according to the third embodiment of the present invention.

Figure 8A:
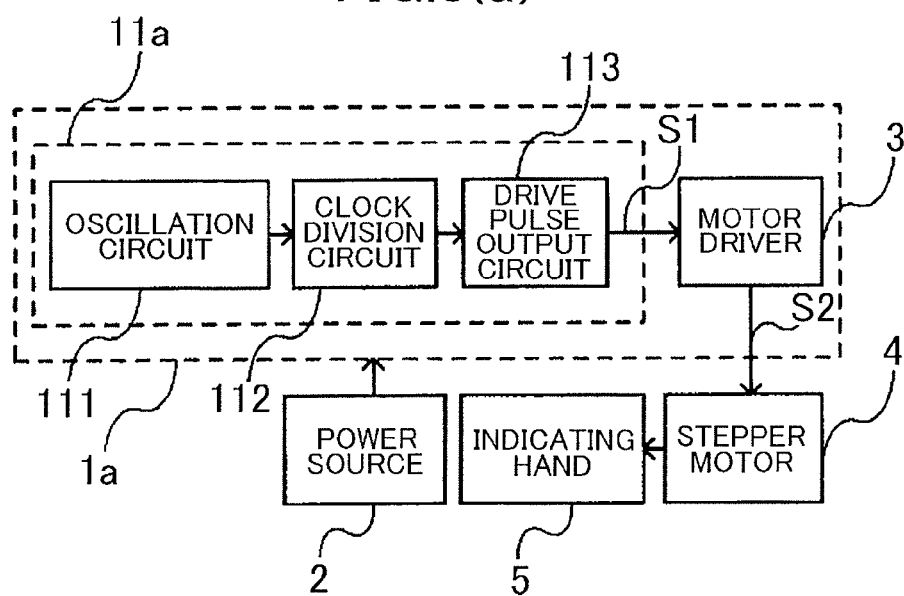
FIG. 8(a) A block diagram illustrating a configuration of an electronic watch including conventional power recovery control means.
Figure 8B:
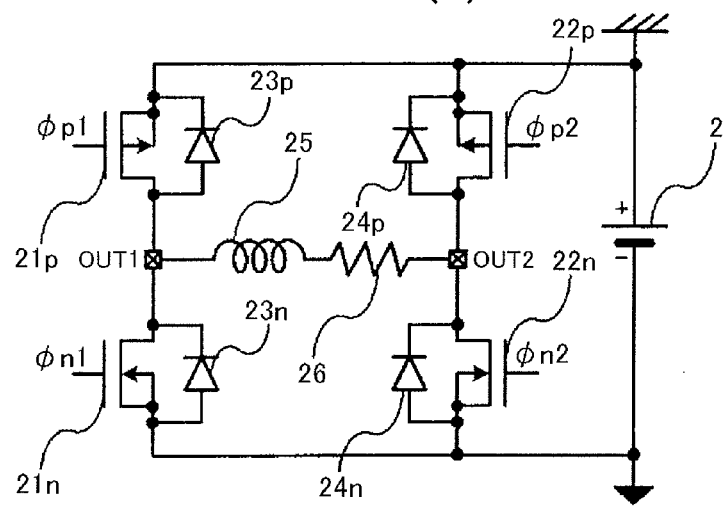
FIG. 8(b) An equivalent circuit diagram illustrating configuration of a conventional motor driver.
Figure 8C:
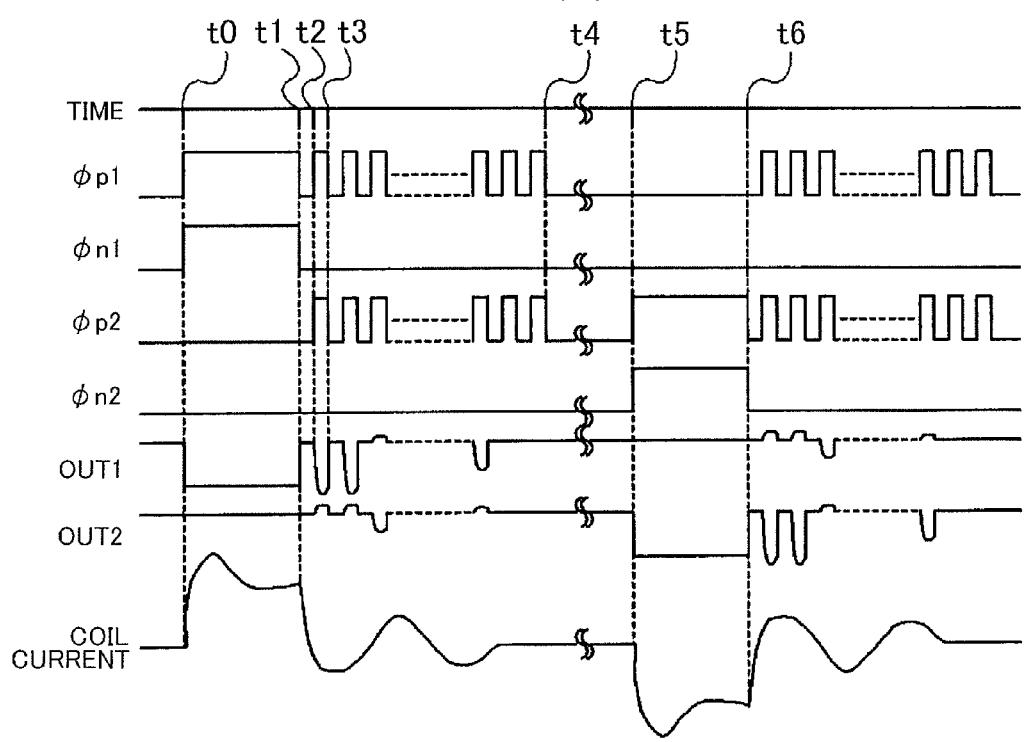
FIG. 8(c) A timing chart showing the operation of the electronic watch including the conventional power recovery control means.

Referring to FIG. 1, the electronic watch including the power recovery control means according to the first embodiment of the present invention is described. Note that the same parts as those of FIG. 8(a) in the conventional example are denoted by the same reference symbols, and their descriptions are omitted.

In FIG. 1, reference numeral 114 denotes a recovery pulse output circuit for outputting a recovery pulse S3 in response to various timing signals generated by the clock division circuit 112. Reference numeral 6 denotes a selector for receiving the drive pulse S1 from the drive pulse output circuit 113 and the recovery pulse S3 as its inputs and selectively outputting any one of the drive pulse S1 and the recovery pulse S3 to the motor driver 3. That is, the drive pulse S1 and the recovery pulse S3 are output by the selector in a switched manner.

Next, the operation of the electronic watch according to the first embodiment of the present invention is described with reference to FIG. 2(a) and FIGS. 3(a) to 3(d).

Figure 3A:
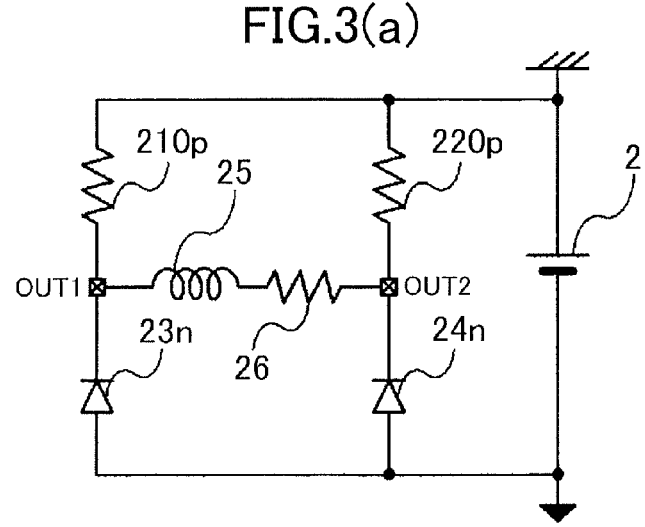
FIG. 3(a) An equivalent circuit diagram illustrating the state of a motor driver according to the first embodiment of the present invention, and illustrating the state before t10.
Figure 3B:
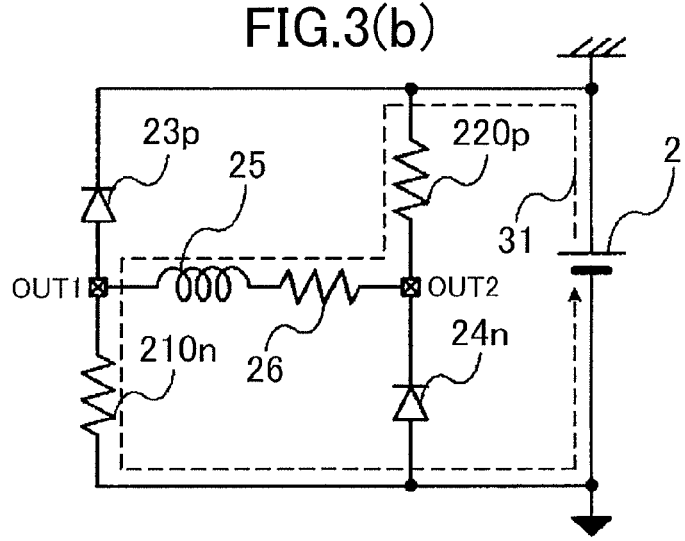
FIG. 3(b) An equivalent circuit diagram illustrating the state of the motor driver according to the first embodiment of the present invention, and illustrating the state between t10 and t11.

In FIG. 2(a), normally (before time t10), the OUT1 terminal and the OUT2 terminal both have the same potential GND(+), and hence the motor driver 3 is in an equivalent circuit state illustrated in FIG. 3(a). That is, the PMOS transistors 21p and 22p are both turned ON and therefore represented by low resistors 210p and 220p, respectively, and the NMOS transistors 21n and 22n are both turned OFF and therefore represented by the parasitic diodes 23n and 24n, respectively. In this case, the OUT1 terminal and the OUT2 terminal both have the same potential GND(+), and hence no current flows through the coil 25.

At time t10, the drive pulse S1 from the drive pulse output circuit 113 is selected by the selector 6 and output to the motor driver 3 as a drive pulse, and then the OUT1 terminal becomes Low level and the OUT2 terminal becomes High level. Accordingly, a current flows through the coil 25, and the stepper motor 4 rotates to advance the indicating hand 5 by one step. At this time, the motor driver 3 is in an equivalent circuit state illustrated in FIG. 3(b). That is, the PMOS transistor 22p and the NMOS transistor 21n are both turned ON and therefore represented by low resistors 220p and 210n, respectively, and the PMOS transistor 21p and the NMOS transistor 22n are both turned OFF and therefore represented by the parasitic diodes 23p and 24n, respectively. A current 31 flows in the motor driver 3 in the direction from the power source 2 via the low resistor 220p, the OUT2 terminal, the series resistance component 26, the coil 25, the OUT1 terminal, and the low resistor 210n, namely a consumption direction.

At time t11, the drive pulse S1 is stopped, and the OUT1 terminal and the OUT2 terminal both have the same potential GND(+), and hence the current supply to the coil 25 is interrupted. However, an induced current is generated because a rotor rotates by inertia.

Figure 3C:
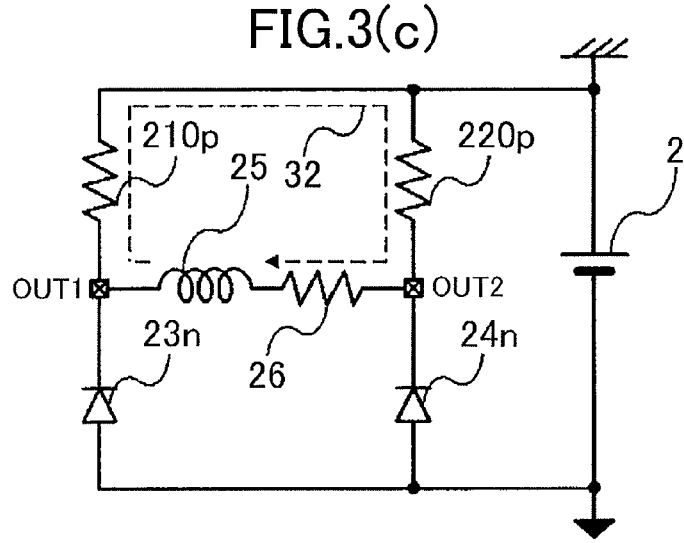
FIG. 3(c) An equivalent circuit diagram illustrating the state of the motor driver according to the first embodiment of the present invention, and illustrating the state immediately before t12.
Figure 3D:
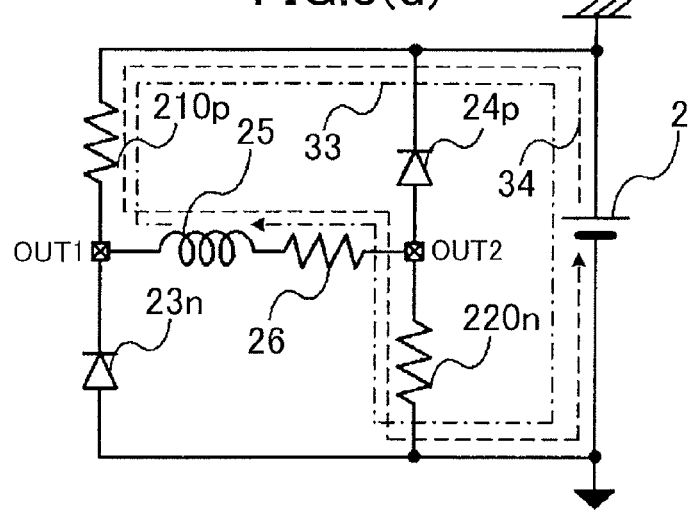
FIG. 3(d) An equivalent circuit diagram illustrating the state of the motor driver according to the first embodiment of the present invention, and illustrating the state between t12 and t13.

Immediately before time t12 at which the induced current approaches the peak, the motor driver 3 is in an equivalent circuit state illustrated in FIG. 3(c). That is, the PMOS transistors 21p and 22p are both turned ON and therefore represented by the low resistors 210p and 220p, respectively, and the NMOS transistors 21n and 22n are both turned OFF and therefore represented by the parasitic diodes 23n and 24n, respectively. A current 32 flowing in the motor driver 3 is an induced current generated by free oscillation of the rotor, which flows in the direction from the coil 25 via the OUT1 terminal, the low resistor 210p, the low resistor 220p, the OUT2 terminal, and the series resistance component 26.

At time t12, the induced current approaches the peak, resulting in the state in which electric power can be recovered most efficiently. In this case, the recovery pulse S3 from the recovery pulse output circuit 114 is selected by the selector 6 and output to the motor driver 3 as a recovery pulse, to thereby set the OUT1 terminal to High level and the OUT2 terminal to Low level in a manner opposite to the case of the drive pulse output between the times t10 and t11 for rotating the stepper motor 4. At this time, the motor driver 3 is in an equivalent circuit state illustrated in FIG. 3(d). That is, the PMOS transistor 21p and the NMOS transistor 22n are both turned ON and therefore represented by low resistors 210p and 220n, respectively, and the PMOS transistor 22p and the NMOS transistor 21n are both turned OFF and therefore represented by the parasitic diodes 24p and 23n, respectively.

At this time, the coil 25 generating an electromotive force and the power source 2 are connected in parallel via the low resistor 210p, the low resistor 220n, and the series resistance component 26. That is, in the motor driver 3, a combined current of a current 33 and a current 34 flows, the current 33 flowing in the direction from the coil 25 via the OUT1 terminal, the low resistor 210p, the power source 2, the low resistor 220n, the OUT2 terminal, and the series resistance component 26, the current 34 flowing from the power source 2 via the low resistor 210p, the OUT1 terminal, the coil 25, the series resistance component 26, the OUT2 terminal, and the low resistor 220n. The current 33 is dominant because the induced current is near the peak and therefore extremely large. The current 33 flows in the direction of charging the power source 2, namely the direction of recovering electric power.

At time t13, the recovery pulse S3 is stopped, and the OUT1 terminal and the OUT2 terminal both have the same potential GND(+), and hence the current supply to the coil 25 is interrupted. However, a slight amount of the induced current still remains because the rotor rotates by inertia, and hence the motor driver 3 returns to the equivalent circuit state illustrated in FIG. 3(c) to end the power recovery operation.

Note that it is considered by experimental measurement conducted by the applicant that an appropriate time width of the recovery pulse between the times t12 and t13 is about less than 1 ms. The reason for this is that if the time width is 1 ms or more, the stepper motor 4 may be rotated, and the amount of a recoverable induced power generated in the coil 25 is reduced and hence the current 34 flowing in the power consumption direction becomes dominant over the current 33 flowing in the power recovery direction in FIG. 3(d).

Between times t14 and t15, the OUT1 terminal becomes High level and the OUT2 terminal becomes Low level in a manner opposite to the case of the drive pulse output between the times t10 and t11. Accordingly, a current flows through the coil 25 in the direction opposite to the case of the drive pulse, and the stepper motor 4 rotates to advance the indicating hand 5 by one step. Between times t16 and t17, the OUT1 terminal is set to Low level and the OUT2 terminal is set to High level in a manner opposite to that in the case of the recovery pulse output between the times t12 and t13. That is, the difference is only that the polarities are reversed from those of the drive pulse output control and the recovery pulse output control which are performed between the times t10 and t13, and hence the detailed description thereof is omitted.

By the way, the operation of the electronic watch in the case where the output timing of the recovery pulse deviates significantly from near the peak of the induced current that is generated because of inertial rotation of the rotor is described with reference to FIG. 2(b) and FIGS. 3(e) and 3(f).

In FIG. 2(b), immediately before time t18 at which an induced current resulting from inertial rotation of the rotor is generated after the output of the drive pulse between times t10 and t11, the motor driver 3 is in an equivalent circuit state illustrated in FIG. 3(e). At this time, a current 35 flows through the motor driver 3 in the direction from the coil 25 via the series resistance component 26, the OUT2 terminal, the low resistor 220p, the low resistor 210p, and the OUT1 terminal, namely the direction opposite to that of the current 32.

At time t18, the recovery pulse S3 from the recovery pulse output circuit 114 is selected by the selector 6 and output to the motor driver 3 as a recovery pulse, to thereby set the OUT1 terminal to High level and the OUT2 terminal to Low level in a manner opposite to the case of the drive pulse output between the times t10 and t11 for rotating the stepper motor 4. At this time, the motor driver 3 is in an equivalent circuit state illustrated in FIG. 3(f).

At this time, the coil 25 generating an electromotive force and the power source 2 are connected in series via the low resistor 210p, the low resistor 220n, and the series resistance component 26. That is, in the motor driver 3, a combined current of a current 36 and a current 37 flows, the current 36 flowing in the direction from the coil 25 via the series resistance component 26, the OUT2 terminal, the low resistor 220n, the power source 2, the low resistor 210p, and the OUT1 terminal, the current 37 flowing in the direction from the power source 2 via the low resistor 210p, the OUT1 terminal, the coil 25, the series resistance component 26, the OUT2 terminal, and the low resistor 220n. Accordingly, the current flows in such a direction that the power source 2 is not charged but electric power is consumed until time t19 at which a recovery pulse is output.

Therefore, as shown at the times t12 and t13 of FIG. 2(a), it is understood that it is desired to output the recovery pulse at the time in the vicinity of the peak of the induced current.

Next, an electronic watch including power recovery control means according to a second embodiment of the present invention is described with reference to FIGS. 4 and 5.

In FIG. 4, reference numeral 7 denotes a power supply voltage detection circuit for detecting a voltage of the power source 2 and outputting the result of detection to the recovery pulse output circuit 114.

Next, the operation of the electronic watch according to the second embodiment of the present invention is described with reference to FIG. 5.

In FIG. 5, normally (before time t20), the OUT1 terminal and the OUT2 terminal both have the same potential GND(+), and hence no current flows through the coil 25.

At time t20, based on the result of the power supply voltage detection circuit 7, a drive pulse S1 from the drive pulse output circuit 113 corresponding to the level of a power supply voltage 41 is selected by the selector 6 and output to the motor driver 3 as a drive pulse, and then the OUT1 terminal becomes Low level and the OUT2 terminal becomes High level. Accordingly, a current flows through the coil 25, and the stepper motor 4 rotates to advance the indicating hand 5 by one step.

At time t21, the drive pulse S1 is stopped, and the OUT1 terminal and the OUT2 terminal both have the same potential GND(+), and hence the current supply to the coil 25 is interrupted. However, the induced current is generated because the rotor rotates by inertia.

By the way, the induced current has different widths and magnitudes depending on the power supply voltage. For example, in the case where the power supply voltage has the level of the high power supply voltage 41, the free oscillation of the rotor becomes stronger and the width of the induced current around the peak becomes larger. That is, a time period during which electric power can be recovered is increased, and hence, in response thereto, the recovery pulse output circuit 114 is controlled so that a recovery pulse S3 having a larger width is selected by the selector 6 and output to the motor driver 3 as a recovery pulse (between time t22 and time t23).

Further, the induced current has different time periods in which the peak appears, depending on the power supply voltage. For example, in the case where the power supply voltage has the level of the high power supply voltage 41, the free oscillation of the rotor becomes stronger and the peak of the induced current comes closer to the output timing of the drive pulse (between times t20 and t21), and hence, in response thereto, the recovery pulse output circuit 114 is controlled so that the recovery pulse S3 is selected by the selector 6 and output to the motor driver 3 as a recovery pulse at an appropriate time.

It is assumed that at time t28, the power supply voltage has reduced because of, for example, the rotation of the stepper motor 4 or the use of other clock functions, thereby resulting in the state in which the voltage has the level of a power supply voltage 42.

At time t24, based on the result of the power supply voltage detection circuit 7, the drive pulse S1 from the drive pulse output circuit 113 corresponding to the level of the power supply voltage 42 is selected by the selector 6 and output to the motor driver 3 as a drive pulse, and then the OUT1 terminal becomes High level and the OUT2 terminal becomes Low level. Accordingly, a current flows through the coil 25, and the stepper motor 4 rotates to advance the indicating hand 5 by one step.

At time t25, the drive pulse S1 is stopped, and the OUT1 terminal and the OUT2 terminal both have the same potential GND(+), and hence the current supply to the coil 25 is interrupted. However, the induced current is generated because the rotor rotates by inertia.

In the case where the power supply voltage has the level of the low power supply voltage 42, the free oscillation of the rotor becomes weaker and the width of the induced current around the peak becomes smaller. That is, the time period during which electric power can be recovered is reduced, and hence, in response thereto, the recovery pulse output circuit 114 is controlled so that a recovery pulse S3 having a smaller width is selected by the selector 6 and output to the motor driver 3 as a recovery pulse (between time t26 and time t27).

Further, in the case where the power supply voltage has the level of the low power supply voltage 42, the free oscillation of the rotor becomes weaker and the peak of the induced current becomes farther from the drive pulse (between times t24 and t25). Therefore, in response thereto, the recovery pulse output circuit 114 is controlled so that the recovery pulse S3 is selected by the selector 6 and output to the motor driver 3 as a recovery pulse at an appropriate time.

Next, an electronic watch including power recovery control means according to a third embodiment of the present invention is described with reference to FIGS. 6 and 7.

In FIG. 6, reference numeral 115 denotes a rotation detection pulse output circuit for outputting a rotation detection pulse S4 used for determining whether the stepper motor 4 has rotated or not. Reference numeral 9 denotes a first current waveform detection circuit for detecting, based on the motor driver 3, from the induced current resulting from the rotation of the stepper motor 4, an induced current having the same polarity as that of the current obtained by the drive pulse (first detection mode). Reference numeral 10 denotes a second current waveform detection circuit for detecting, based on the motor driver 3, from the induced current resulting from the rotation of the stepper motor 4, an induced current having the polarity opposite to that of the current obtained by the drive pulse (second detection mode). Reference numeral 8 denotes a rotation detection circuit for receiving a detection signal of the first current waveform detection circuit 9 and a detection signal of the second current waveform detection circuit 10 to determine whether the stepper motor 4 has rotated or not. The rotation detection circuit 8 outputs the result of determination to the recovery pulse output circuit 114.

Note that the method of determining whether the stepper motor has rotated or not in the first detection mode and the second detection mode is disclosed in Patent Literature 2 described above by the applicant of the present invention, and hence the detailed description thereof is omitted.

Next, the operation of the electronic watch according to the third embodiment of the present invention is described with reference to FIG. 7.

In FIG. 7, normally (before time t30), the OUT1 terminal and the OUT2 terminal both have the same potential GND(+), and hence no current flows through the coil 25.

At time t30, based on the result of the power supply voltage detection circuit 7, the drive pulse S1 from the drive pulse output circuit 113 corresponding to the level of a power supply voltage 43 is selected by the selector 6 and output to the motor driver 3 as a drive pulse, and then the OUT1 terminal becomes Low level and the OUT2 terminal becomes High level. Accordingly, a current flows through the coil 25, and the stepper motor 4 rotates to advance the indicating hand 5 by one step.

At time t31, the drive pulse S1 is stopped, and the OUT1 terminal and the OUT2 terminal both have the same potential GND(+), and hence the current supply to the coil 25 is interrupted. However, the induced current is generated because the rotor rotates by inertia.

At time t32, the rotation detection pulse S4 for determining whether the stepper motor 4 has rotated or not is selected by the selector 6 and output to the motor driver 3 as a rotation detection pulse. As a result, the induced current having the same polarity as that of the drive pulse is converted into a voltage by a detection resistor (not shown) included in the first current waveform detection circuit, and the OUT2 terminal is changed to Low level and a rotation detection signal is thereby obtained. At time t33, the rotation detection pulse is stopped, and the OUT1 terminal and the OUT2 terminal both have the same potential GND(+). This operation is repeated for a predetermined given number of times to end the detection performed by the first current waveform detection circuit.

At time t34 immediately after the end of the detection, the recovery pulse S3 from the recovery pulse output circuit 114 is selected by the selector 6 and output to the motor driver 3 as a recovery pulse, to thereby set the OUT1 terminal to High level and the OUT2 terminal to Low level in a manner opposite to the case of the drive pulse output between the times t30 and t31 for rotating the stepper motor 4. In this way, electric power is recovered.

At time t35, the recovery pulse S3 is stopped, and the OUT1 terminal and the OUT2 terminal both have the same potential GND(+), and hence operation of electric power recovery is ended.

Further, at time t36, the rotation detection pulse S4 for determining whether the stepper motor 4 has rotated or not is selected by the selector 6 and output to the motor driver 3 as a rotation detection pulse. As a result, the induced current having the opposite polarity to that of the drive pulse is converted into a voltage by a detection resistor (not shown) included in the second current waveform detection circuit, and the OUT1 terminal is changed to Low level and a rotation detection signal is thereby obtained. At time t37, the rotation detection pulse is stopped, and the OUT1 terminal and the OUT2 terminal both have the same potential GND(+). This operation is repeated for a predetermined given number of times to end the detection performed by the second current waveform detection circuit.

As described above, according to this embodiment, it is possible to realize an electronic watch having reduced power consumption, which is capable of recovering electric power more efficiently with a simple configuration and an economical operation without affecting the rotation detection of the stepper motor.

Note that the timings of the pulses to be output from the rotation detection pulse output circuit 115 and the recovery pulse output circuit 114 described above are controlled by an adjustment circuit 12. That is, the adjustment circuit 12 controls the operations of the rotation detection pulse output circuit 115 and the recovery pulse output circuit 114 in order to prevent an erroneous determination regarding the presence or absence of the rotation in the rotation detection circuit 8. In this embodiment, the adjustment circuit 12 controls the timings of the pulses to be output from the rotation detection pulse output circuit 115 and the recovery pulse output circuit 114. However, as exemplified by an electronic watch according to embodiments to be described below, the adjustment circuit 12 may control the presence or absence of each pulse, or may control a threshold for the detection in the rotation detection circuit 8 (illustrated by a broken arrow in FIG. 6).

Further, the adjustment circuit 12 does not always need to be provided independently of the rotation detection pulse output circuit 115, the recovery pulse output circuit 114, and the rotation detection circuit 8. The adjustment circuit 12 may be provided in each of the rotation detection pulse output circuit 115, the recovery pulse output circuit 114, and the rotation detection circuit 8 so that the control is performed through mutual communications among the rotation detection pulse output circuit 115, the recovery pulse output circuit 114, and the rotation detection circuit 8.

Subsequently, the following embodiments describe examples of recovering electric power without causing an erroneous detection in rotation detection in the case where the output timing of the rotation detection pulse is variable.

First, a fourth embodiment of the present invention is described with reference to FIGS. 9 and 10. Note that an electronic watch including power recovery means according to this embodiment has the same configuration as that in the third embodiment described above, and hence FIG. 6 is referred to as a block diagram illustrating the configuration of the electronic watch according to this embodiment.

Figure 9:
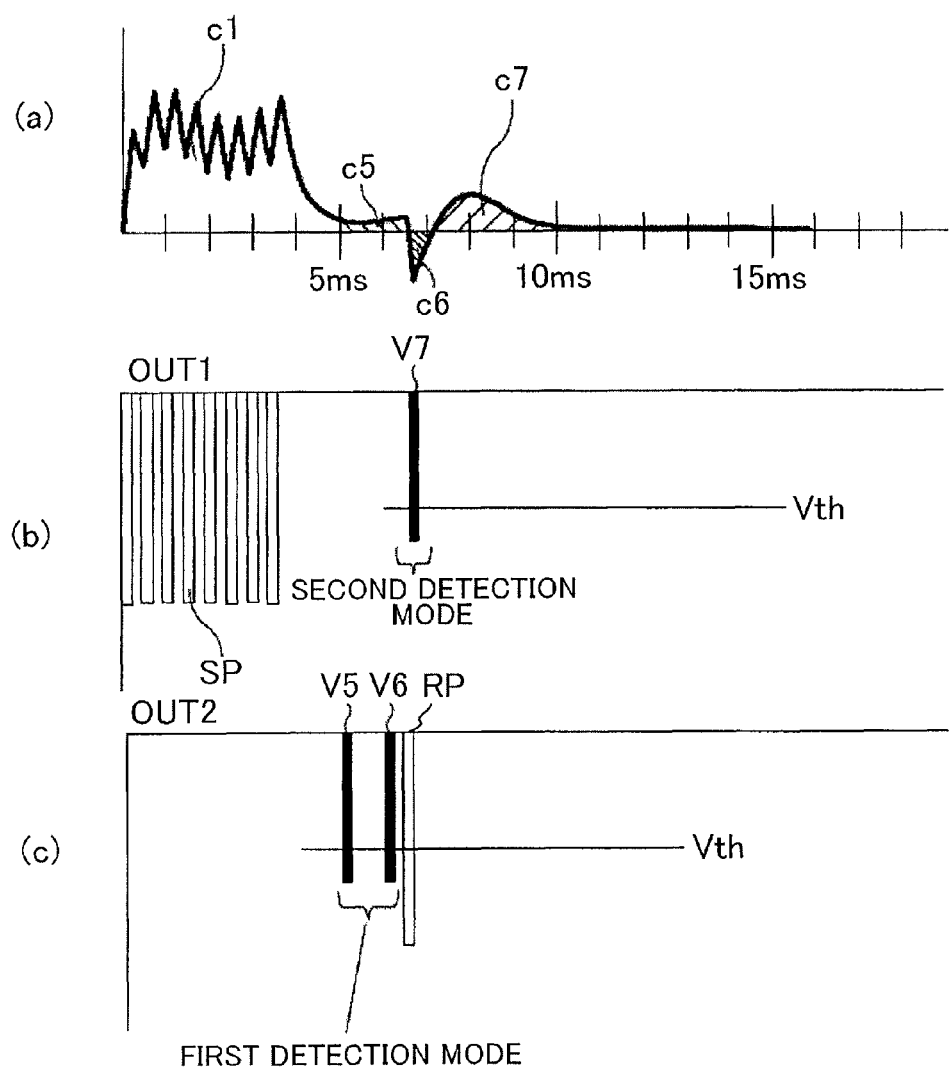
FIG. 9 A timing chart showing a waveform of a current generated in a stepper motor and pulses applied to both terminals of a coil of the stepper motor in the case where a rotor has not rotated in a comparative example.

Before describing the operation of the electronic watch according to this embodiment, the case where an erroneous detection occurs in rotation detection due to power recovery is described as a comparative example with reference to FIG. 9. FIG. 9 is a timing chart showing a waveform of a current generated in the stepper motor 4 and pulses applied to both terminals of the coil of the stepper motor 4 in the case where the rotor has not rotated in the comparative example. In FIG. 9, part (a) represents a current waveform of an induced current generated in the coil, part (b) represents a potential at one terminal OUT1 of the coil, and part (c) represents a potential at another terminal OUT2 of the coil.

First, a drive pulse SP for rotating the rotor of the stepper motor 4 is output every second, on the second, and a current waveform c1 is accordingly generated. This example assumes that the rotor has failed to rotate. Note that the reason why the drive pulse SP has a comb-shaped waveform is that the duty ratio of the drive pulse SP is set to a value smaller than the maximum value and hence the period during which the drive pulse SP is actually output is shorter than the output period of the drive pulse SP. The current waveform c1 has a sawtooth shape corresponding to the shape of the drive pulse SP.

Then, after 5 ms has elapsed since the second, the first detection mode for rotation detection is started, and a rotation detection pulse is applied to the terminal OUT2 every 1 ms. This rotation detection pulse is a pulse for detecting that an induced current is generated in such a direction that the terminal OUT2 side becomes L level. When the value of the voltage detected on the terminal OUT2 side is smaller than a threshold voltage Vth (that is, when the absolute value of the detected voltage value is larger than the absolute value of the threshold voltage Vth), it is determined that the detection has succeeded. Then, when the detection has succeeded twice in the first detection mode, the mode shifts to the second detection mode to be described next. In this example, a current waveform c5 is positive at the times of 5 ms and 6 ms from the second. It follows that the detection has succeeded by rotation detection pulses V5 and V6.

After the shift to the second detection mode, a rotation detection pulse is applied to the terminal OUT1 every 1 ms. This rotation detection pulse is a pulse for detecting that an induced current is generated in such a direction that the terminal OUT1 side becomes L level. When the value of the voltage detected on the terminal OUT1 side is smaller than the threshold voltage Vth (that is, when the absolute value of the detected voltage value is larger than the absolute value of the threshold voltage Vth), it is determined that the detection has succeeded. Then, when the detection has succeeded in a period predetermined as the second detection mode (6 ms in this example), it is determined that the rotor has rotated. In this example, a rotation detection pulse V7 is a detection pulse in the second detection mode, and a current waveform c6 at the time of 7 ms from the second is negative, and hence the detection is determined to have succeeded by the rotation detection pulse V7.

In FIG. 9, reference symbol RP denotes a recovery pulse. As is easily understood from part (a) of FIG. 9, the current waveform has a shape in which, when the recovery pulse RP is not output, the current waveform c5 and a current waveform c7 are smoothly continuous and never become negative, and hence it is never determined that the detection has succeeded in the second detection mode and it is detected properly that the rotor has not rotated. On the other hand, at the time when the recovery pulse RP is applied, the power supply voltage is superimposed on the coil of the stepper motor 4, and hence the current waveform c6 having a negative value is generated. Therefore, the detection is determined to have succeeded by the rotation detection pulse V7. As a result, it is erroneously determined that the rotor has rotated even though the rotor has not actually rotated, thus causing a delay in the electronic watch.

Figure 10:
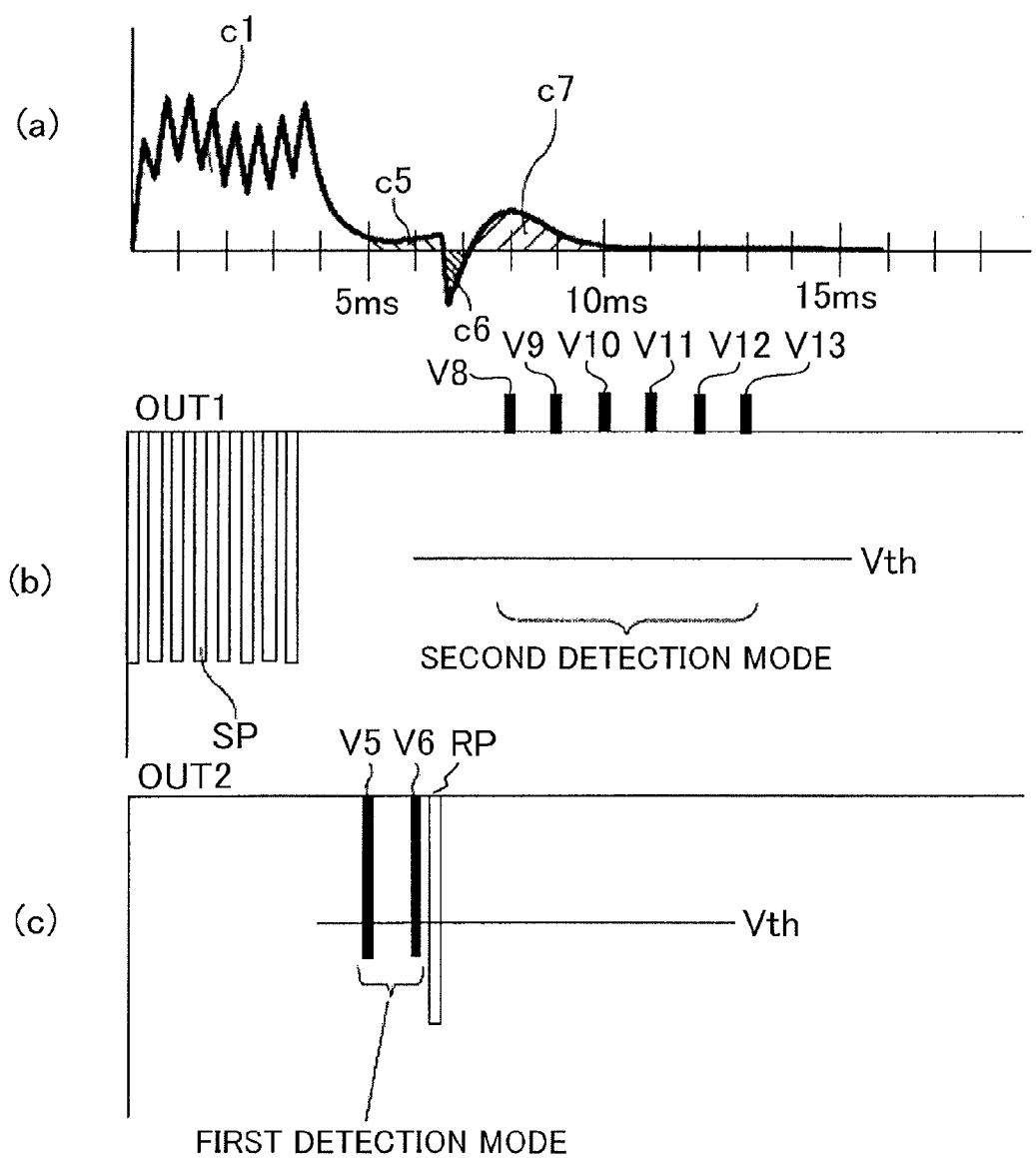
FIG. 10 A timing chart showing a waveform of a current generated in the stepper motor and pulses applied to both terminals of the coil of the stepper motor in the case where the rotor has not rotated in a fourth embodiment.

FIG. 10 is a timing chart showing a waveform of a current generated in the stepper motor 4 and pulses applied to both terminals of the coil of the stepper motor 4 in the case where the rotor has not rotated in this embodiment that takes the above-mentioned point into account.

First, a drive pulse SP is output to the terminal OUT1 every second, on the second, and a current waveform c1 is accordingly generated. Then, after 5 ms has elapsed since the second, the first detection mode is started, and rotation detection pulses V5 and V6 are output. The rotation detection pulses V5 and V6 correspond to the current waveform c5, and hence the detection is determined to have succeeded. The detection has succeeded twice, and hence the mode shifts to the second detection mode similarly to the comparative example described above.

In the electronic watch according to this embodiment, the recovery pulse RP is output immediately after the success of the detection in the first detection mode, and in order to prevent an erroneous detection by the recovery pulse RP in the second detection mode, the output of the rotation detection pulse is inhibited in the second detection mode for a given period. In other words, in the electronic watch according to this embodiment, the recovery pulse RP is output after the end of the detection using a first detection pulse (=rotation detection pulse in the first detection mode) for detecting the induced current waveform having the same polarity as that of the current waveform resulting from the drive pulse SP, and, after a predetermined period has elapsed, the output of a second detection pulse (=rotation detection pulse in the second detection mode) for detecting the induced current waveform having the polarity opposite to that of the current waveform resulting from the drive pulse SP is started.

This configuration eliminates the influence of the recovery pulse RP, thus preventing an erroneous determination. In this example, the output of the rotation detection pulse in the second detection mode is inhibited for 1 ms after the output of the recovery pulse RP. Therefore, the rotation detection pulse in the second detection mode is not output when 7 ms has elapsed from the second, but is output after 8 ms has elapsed from the second (V8, V9, V10, V11, V12, and V13 in FIG. 10). Those rotation detection pulses correspond to the positive current waveform c7, and hence each detection has failed, that is, the detection has not succeeded within 6 ms as the period of the second detection mode. Therefore, it is detected properly that the rotor has not rotated.

Subsequently, a fifth embodiment of the present invention is described with reference to FIGS. 11 and 12. Note that, an electronic watch including power recovery means according to this embodiment also has the same configuration as that in the third embodiment described above, and hence FIG. 6 is referred to as a block diagram illustrating the configuration of the electronic watch according to this embodiment.

Figure 11:
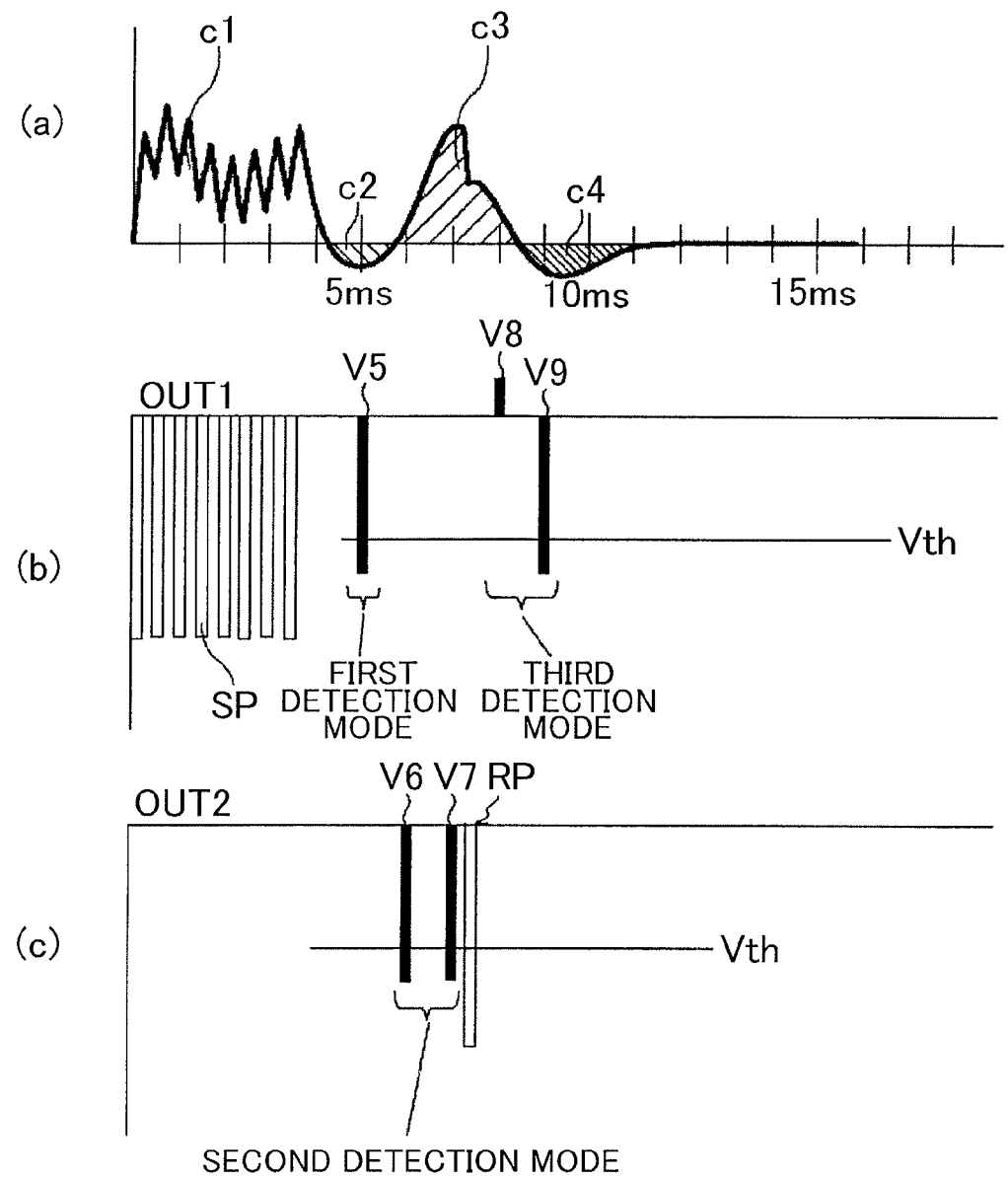
FIG. 11 A timing chart showing a waveform of a current generated in the stepper motor and pulses applied to both terminals of the coil of the stepper motor in the case where the rotor has rotated in a fifth embodiment.

FIG. 11 is a timing chart showing a waveform of a current generated in the stepper motor 4 and pulses applied to both terminals of the coil of the stepper motor 4 in the case where the rotor has rotated in this embodiment.

First, a drive pulse SP is output to the terminal OUT1 every second on the second, and a current waveform c1 is accordingly generated.

Then, in this embodiment, a rotation detection pulse V5 in the first detection mode is output after 5 ms has elapsed from the second. Unlike the first detection mode in the fourth embodiment described above, the rotation detection pulse V5 is a pulse for detecting that an induced current is generated in such a direction that the terminal OUT2 side becomes L level. When the value of the voltage detected on the terminal OUT2 side is smaller than a threshold voltage Vth (that is, when the absolute value of the detected voltage value is larger than the absolute value of the threshold voltage Vth), it is determined that the possibility of the rotation is high. In the case where the rotor has rotated normally, a current waveform c2 having a negative current value is generated immediately after the current waveform c1 resulting from the drive pulse SP, and the current waveform c2 is detected. Therefore, if the current waveform c2 is detected, the possibility that the rotor has rotated is high. In other words, the first detection mode of this embodiment is a mode of outputting a preliminary detection pulse for performing preliminary detection of preliminarily detecting the presence or absence of the rotation of the rotor. The electronic watch according to this embodiment is configured so that whether the rotation has succeeded or not is simply determined by the detection in the first detection mode, and when the possibility of the rotation is low, that is, when the current waveform c2 has failed to be detected, the output of the recovery pulse RP is inhibited in order to prevent an erroneous detection. That is, in the case where the rotation detection circuit 8 (see FIG. 6) has detected in the preliminary detection in the preliminary detection mode that the rotor has not rotated, the adjustment circuit 12 (see FIG. 6) inhibits the output of the recovery pulse RP from the recovery pulse output circuit 114 (see FIG. 6). In this example, the rotation detection pulse V5 corresponds to the current waveform c2, and hence it is determined that the possibility of the rotation is high, and the output of the recovery pulse RP is not inhibited.

Subsequently, the second detection mode is started after 6 ms has elapsed from the second, and rotation detection pulses V6 and V7 are output. In the second detection mode, similarly to the first detection mode in the fourth embodiment described above, it is detected that an induced current is generated in such a direction that the terminal OUT1 side becomes L level. In this example, the detection by the rotation detection pulses V6 and V7 is determined to have succeeded because the current waveform c3 is obtained. The detection has succeeded twice, and hence the mode shifts to a subsequent third detection mode.

The recovery pulse RP, on the other hand, is output because the detection in the first detection mode has succeeded. In this way, electric power is recovered. The output timing of the recovery pulse RP is selected so that recovery efficiency may be higher, and is determined in advance to be around the peak position of the current waveform c3, for example. Note that the output timing of the recovery pulse RP may be set as the time immediately after the success of the detection in the second detection mode.

Further, in this example, the third detection mode is started at the time of 8 ms from the second. In the third detection mode, similarly to the second detection mode in the fourth embodiment described above, it is detected that an induced current is generated in such a direction that the terminal OUT1 side becomes L level. In this example, a rotation detection pulse V8 is a pulse for detecting the current waveform c3 still having a positive current value, and hence the detection by the rotation detection pulse V8 has failed, but a subsequent rotation detection pulse V9 is a pulse for detecting the current waveform c4 having a negative current value, and hence the detection by the rotation detection pulse V9 has succeeded. Then, because the detection has succeeded in the third detection mode, it is determined properly that the rotor has rotated. As described above, in this embodiment, the second detection mode and the third detection mode are modes for further detecting the presence or absence of the rotation of the rotor after the preliminary detection. In other words, the second detection mode and the third detection mode of this embodiment are modes for outputting a main detection pulse used for performing main detection of detecting the presence or absence of the rotation of the rotor after the preliminary detection. The rotation detection pulses to be output in the second detection mode and the third detection mode, in this case, the rotation detection pulses V6 to V9, correspond to the main detection pulses.

Figure 12:
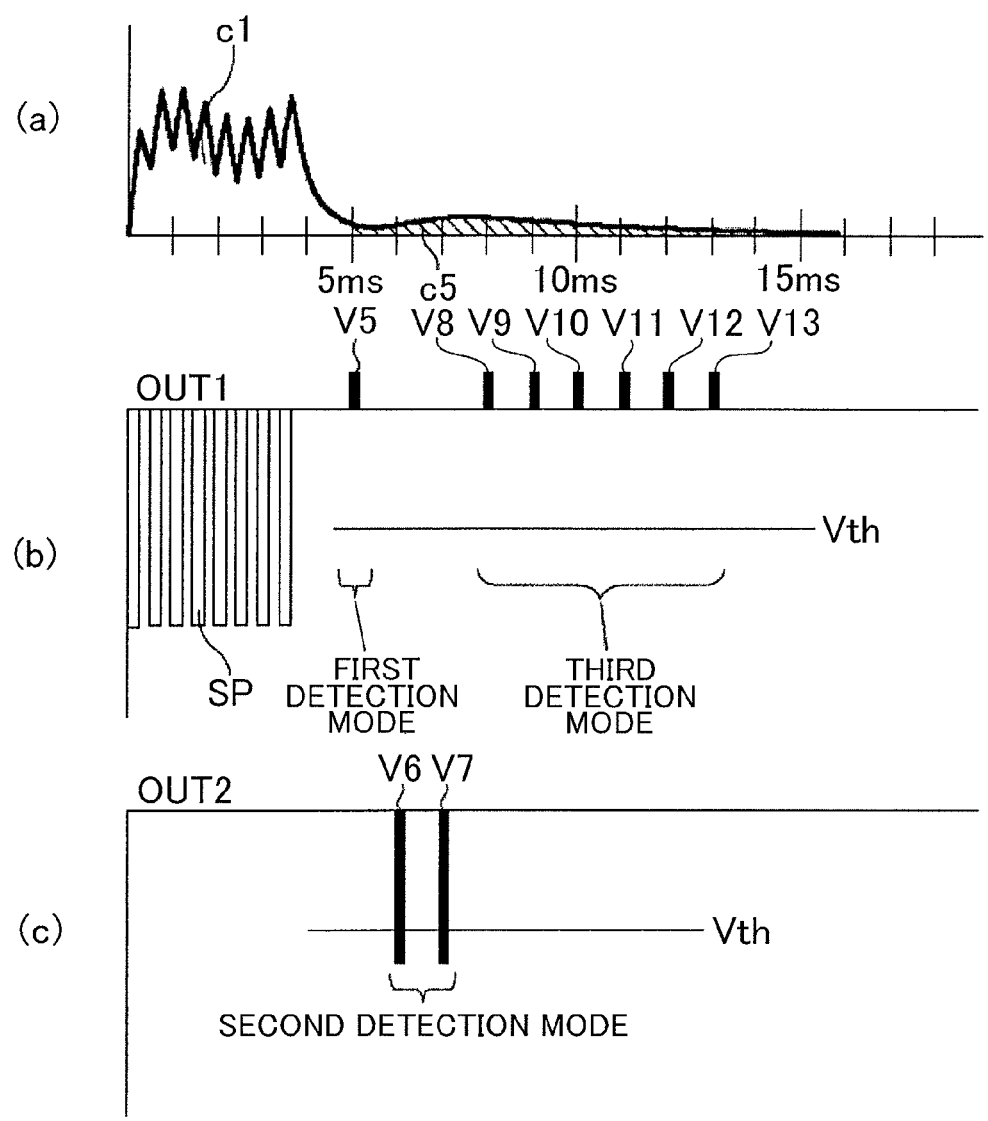
FIG. 12 A timing chart showing a waveform of a current generated in the stepper motor and pulses applied to both terminals of the coil of the stepper motor in the case where the rotor has not rotated in the fifth embodiment.

FIG. 12 is a timing chart showing a waveform of a current generated in the stepper motor 4 and pulses applied to both terminals of the coil of the stepper motor 4 in the case where the rotor has not rotated in this embodiment.

In this case, as shown in FIG. 12, the current waveform c5 having a positive current value appears immediately after the current waveform c1 obtained by the drive pulse SP, but a current waveform having a negative current value as shown in FIG. 11 does not appear. Therefore, the detection by the rotation detection pulse V5 in the first detection mode has failed, and the output of the recovery pulse RP is inhibited.

In the subsequent second detection mode, the rotation detection pulses V6 and V7 are pulses for detecting the current waveform c5 having a positive current value, and hence each detection has succeeded. Then, because the detection has succeeded twice, the mode shifts to the subsequent third detection mode. On the other hand, the recovery pulse RP is not output because the detection in the first detection mode has failed.

Therefore, in the third detection mode, an erroneous detection caused by the influence of the recovery pulse RP does not occur. Rotation detection pulses V8 to V13 in the third detection mode correspond to the current waveform c5 having a positive current value, and hence each detection has failed. As a result, it is determined properly that the rotor has not rotated.

Note that in the preliminary detection in this embodiment, the presence or absence of the rotation of the rotor is preliminarily detected, that is, it is predicted that the possibility of the rotation or non-rotation of the rotor is high. Therefore, definitive determination on whether the rotor has actually rotated or not needs to depend on the main detection. In other words, there may be a case where it is detected in the main detection that the rotor has not rotated even though it has been predicted in the preliminary detection that the possibility of the rotation of the rotor is high, or a case where it is detected in the main detection that the rotor has rotated even though it has been predicted in the preliminary detection that the possibility of the non-rotation of the rotor is high.

Figure 13:
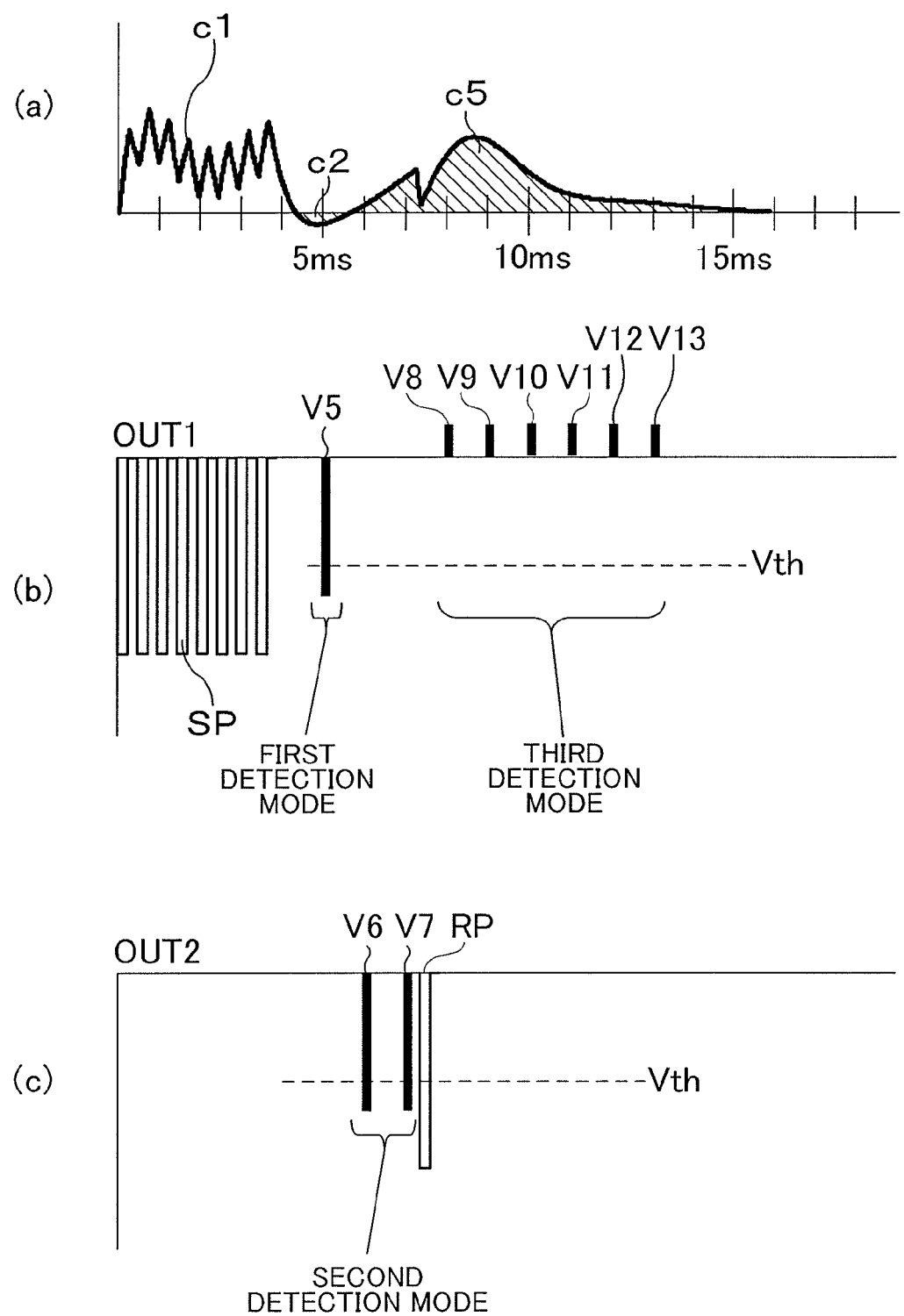
FIG. 13 A timing chart showing a waveform of a current generated in the stepper motor and pulses applied to both terminals of the coil of the stepper motor in the case where it has been predicted in preliminary detection that the rotor has rotated but it is detected in main detection that the rotor has not rotated, in the fifth embodiment.

FIG. 13 is a timing chart showing a waveform of a current generated in the stepper motor and pulses applied to both terminals of the coil of the stepper motor in the case where it has been predicted in preliminary detection that the rotor has rotated but it is detected in main detection that the rotor has not rotated, in the this embodiment.

The current waveform shown in part (a) of FIG. 13 is a waveform generated when the movement of the indicating hand fluctuates due to a reduction in power supply voltage, an external action, a change in posture, or other such influences, and the drive power is slightly lowered. In this case, as shown in FIG. 13, the current waveform c2 having a negative current value appears immediately after the current waveform c1 obtained by the drive pulse SP. Therefore, the detection by the rotation detection pulse V5 in the first detection mode is determined to have succeeded. Thus, in this case, it is determined in the preliminary detection that the possibility of the rotation of the rotor is high, and the output of the recovery pulse RP is not inhibited.

In the subsequent second detection mode, the rotation detection pulses V6 and V7 are pulses for detecting the current waveform c5 having a positive current value, and hence each detection has succeeded. Then, because the detection has succeeded twice, the mode shifts to the subsequent third detection mode, and the recovery pulse RP is output at a time predicted to be around the peak position of the current waveform c3 or immediately after the detection in the second detection mode has succeeded, to thereby recover electric power.

However, rotation detection pulses V8 to V13 output in the third detection mode correspond to the current waveform c5 having a positive current value, and hence each detection has failed. Then, because the detection has not succeeded within 6 ms as the period of the third detection mode, it is determined properly that the rotor has not rotated. That is, in the main detection, it is determined properly that the rotor has not rotated.

At this time, the recovery pulse RP is output even though the rotor has not actually rotated. However, as in this example, in the case where the current waveform c2 is generated, the current value of the subsequent current waveform c5 is high, and the recovery pulse RP is a pulse weak enough not to rotate the rotor. Therefore, as shown in FIG. 13, in the third detection mode, the current value of the current waveform never becomes negative. Thus, in the main detection, it is determined properly that the rotor has not rotated.

Figure 14:
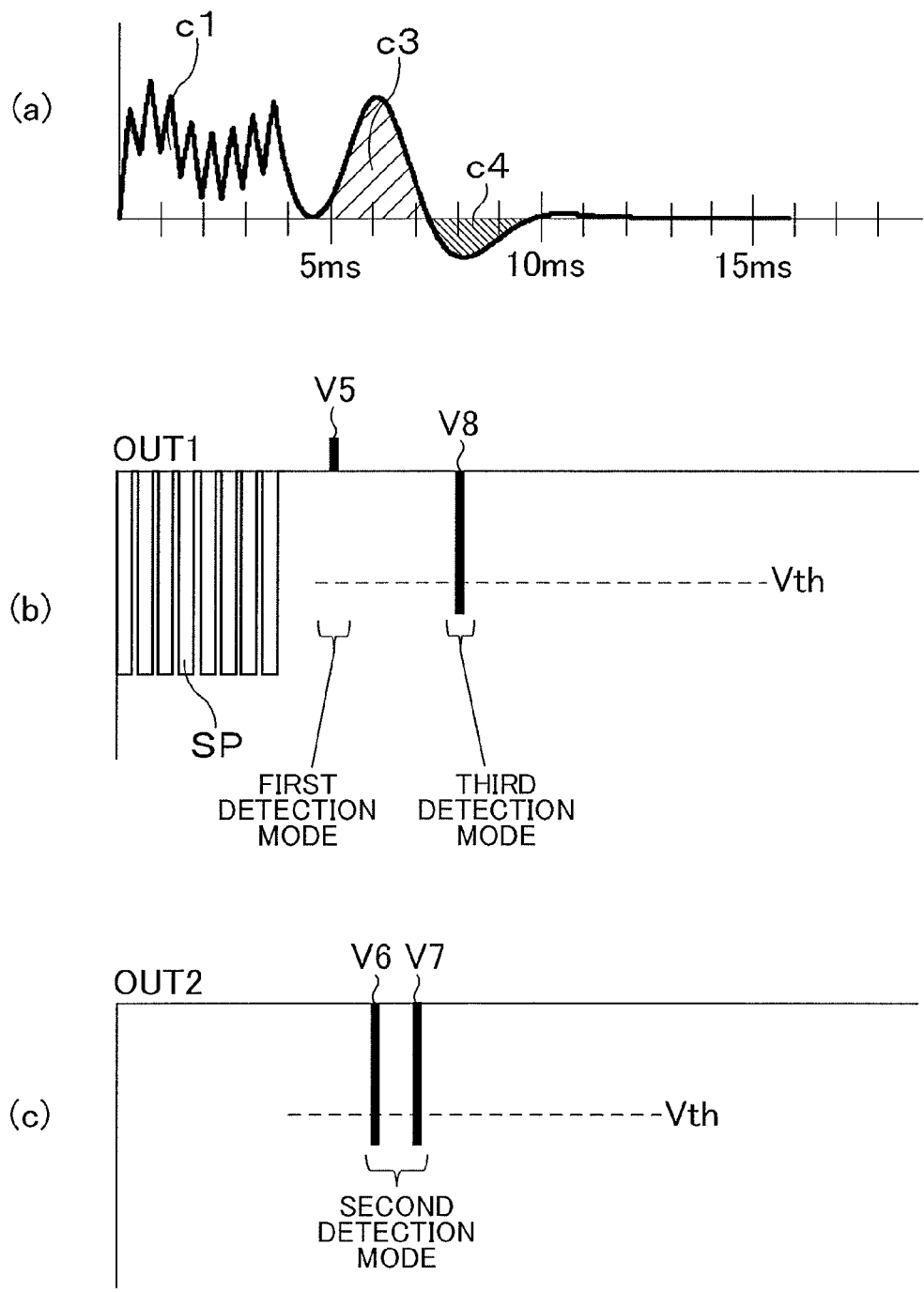
FIG. 14 A timing chart showing a waveform of a current generated in the stepper motor and pulses applied to both terminals of the coil of the stepper motor in the case where it has been predicted in preliminary detection that the rotor has not rotated but it is detected in main detection that the rotor has rotated, in the fifth embodiment.

FIG. 14 is a timing chart showing a waveform of a current generated in the stepper motor and pulses applied to both terminals of the coil of the stepper motor in the case where it has been predicted in preliminary detection that the rotor has not rotated but it is detected in main detection that the rotor has rotated, in this embodiment.

The current waveform shown in part (a) of FIG. 14 is generated when a large load has occurred temporarily, for example, in the case of driving a calendar mechanism. In the case where a large load has occurred temporarily, the duty ratio of the drive pulse is not set to the lowest duty ratio needed to rotate the rotor normally but set to a temporary high duty ratio. Even after the driving of the calendar mechanism is finished, the high duty ratio is maintained for a while. In this case, as shown in FIG. 14, the current waveform having a negative current value does not appear immediately after the current waveform c1 obtained by the drive pulse SP. Therefore, the detection by the rotation detection pulse V5 in the first detection mode fails, it is determined in the preliminary detection that the possibility that the rotor has not rotated is high, and the output of the recovery pulse RP is inhibited.

In the subsequent second detection mode, the rotation detection pulses V6 and V7 are pulses for detecting the current waveform c3 having a positive current value, and hence each detection has succeeded. Then, because the detection has succeeded twice, the mode shifts to the subsequent third detection mode. At this time, the recovery pulse RP is not output because its output is inhibited.

Then, because a rotation detection pulse V8 is output in the subsequent third detection mode, the current waveform c4 having a negative current value is detected, and hence the detection is determined to have succeeded. Because the detection has succeeded in the third detection mode, it is determined properly in this case that the rotor has rotated. That is, in the main detection, it is determined properly that the rotor has rotated.

At this time, the recovery pulse RP is not output even though the rotor has actually rotated, and hence electric power cannot be regenerated. However, as in this example, in the state in which the duty ratio of the drive pulse SP is high, if it is detected properly and continuously for a given period that the rotor has rotated, the duty ratio of the drive pulse SP can be decreased. As a result, electric power required for driving the rotor is reduced, and the current waveform shown in FIG. 11(a) is obtained, and hence electric power is regenerated. That is, lower power consumption can consequently be achieved.

Subsequently, a sixth embodiment of the present invention is described with reference to FIGS. 15 and 16. Note that, an electronic watch including power recovery means according to this embodiment also has the same configuration as that in the third embodiment described above, and hence FIG. 6 is referred to as a block diagram illustrating the configuration of the electronic watch according to this embodiment.

Figure 15:
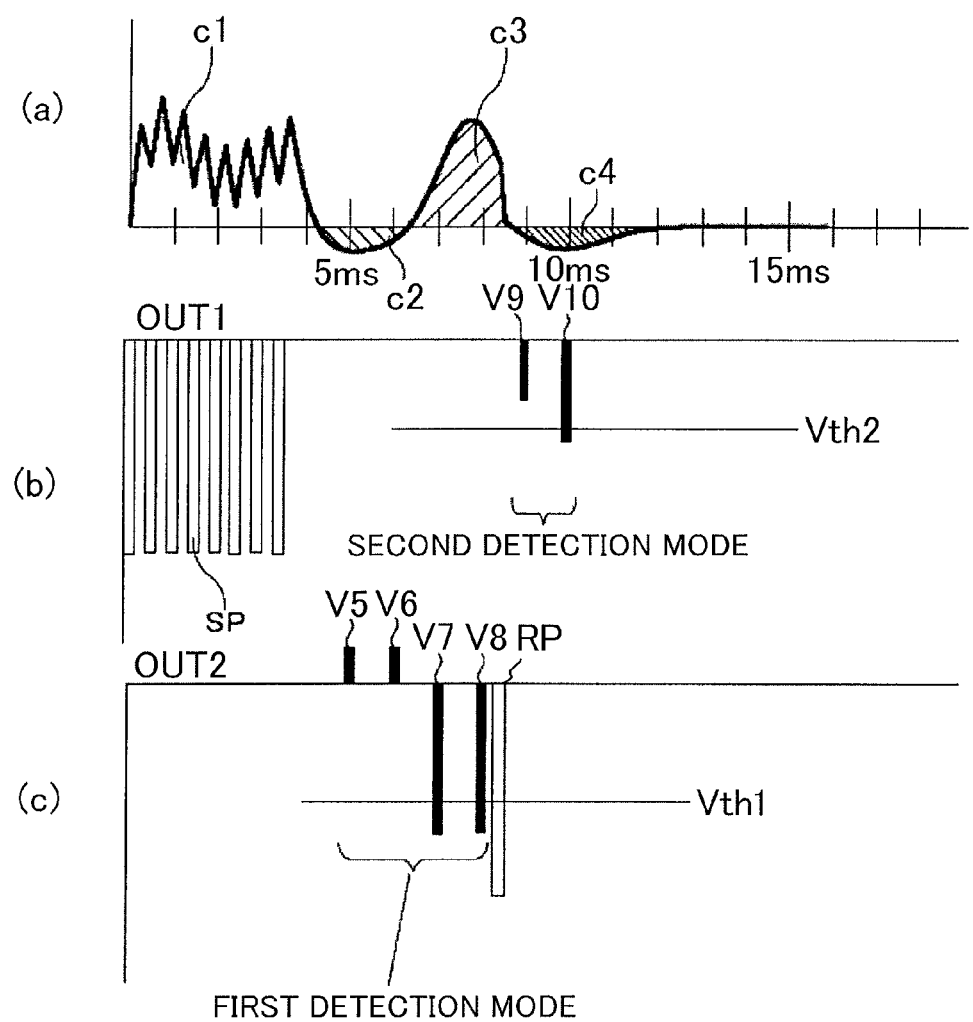
FIG. 15 A timing chart showing a waveform of a current generated in the stepper motor and pulses applied to both terminals of the coil of the stepper motor in the case where the rotor has rotated, in a sixth embodiment.

FIG. 15 is a timing chart showing a waveform of a current generated in the stepper motor 4 and pulses applied to both terminals of the coil of the stepper motor 4 in the case where the rotor has rotated in this embodiment.

First, a drive pulse SP is output to the terminal OUT1 every second, on the second, and a current waveform c1 is accordingly generated.

Then, in this embodiment, a rotation detection pulse V5 in the first detection mode is output after 5 ms has elapsed from the second. As in the first detection mode in the fourth embodiment described above, the first detection mode is a mode for detecting that an induced current is generated in such a direction that the terminal OUT1 side becomes L level. At this time, a threshold voltage Vth1 to be compared with the voltage value detected on the terminal OUT2 side is the same value as the threshold voltage Vth in the first detection mode of the fourth embodiment described above. In this example, the detection by rotation detection pulses V5 and V6 at the times of 5 ms and 6 ms from the second has failed because the current waveform c2 has a negative current value, but the subsequent detection by rotation detection pulses V7 and V8 is determined to have succeeded because the current waveform c3 has a positive current value. The detection has succeeded twice in the first detection mode, and hence the mode shifts to the second detection mode.

On the other hand, in this embodiment, the recovery pulse RP is output immediately after the success of the detection in the first detection mode, in this example, after the output of the rotation detection pulse V8. Note that the recovery pulse RP may be output at a time determined in advance so that recovery efficiency may be higher.

As described above, the recovery pulse RP acts as a brake on the rotor, and hence the rotor loses its rotational kinetic energy and a subsequent induced current generated by the rotor has a smaller current waveform. In the example shown in FIG. 15, the value (absolute value) of the current waveform c4 becomes smaller compared with the case where the recovery pulse RP is not output, and hence it becomes difficult to detect the current waveform.

Further, the current waveform shown in part (a) of FIG. 15 and the current waveform shown in part (a) of FIG. 11 of the above-mentioned embodiment have different shapes, specifically, different peak positions. The reason for this is that in an electronic watch, the movement of the indicating hand fluctuates due to various causes including an external force such as impact and a change in posture, and hence the current waveform obtained every second, on the second, is not always the same. Therefore, even with the above-mentioned method, the recovery pulse RP cannot always be output at the peak position of the current waveform c3 and may deviate as shown in FIG. 15. If the recovery pulse is output at a time not corresponding to the peak position of the current waveform c3, the value (absolute value) of the subsequent current waveform c4 becomes smaller, and it becomes more difficult to detect the current waveform.

In light of this, in this embodiment, the detection sensitivity for detecting the current waveform c4 is changed. That is, when the recovery pulse RP is output, in the second detection mode, the detection sensitivity for detecting that an induced current is generated in such a direction that the terminal OUT2 side becomes L level is increased.

Note that the method of changing the detection sensitivity is not particularly limited. For example, in the circuit for detecting the rotation, a plurality of voltage regulators for generating threshold voltages may be prepared in advance so as to switch a threshold voltage of a comparator for comparing the value of a voltage input in the rotation detection with the threshold voltage. In this case, the detection sensitivity becomes higher as the absolute value of the threshold voltage becomes smaller. The example shown in FIG. 15 is an example in which two threshold voltages Vth1 and Vth2 are prepared and switched alternately. Alternatively, the absolute value of an induced voltage to be generated may be changed by changing the resistance value of the detection resistor to be connected to the terminal of the coil. For example, a plurality of detection resistors having different resistance values are connected to the terminal of the coil in a switchable manner, and by switching to a detection resistor having a high resistance, the induced voltage is increased to facilitate the detection. In this case, the detection sensitivity becomes higher as the resistance value of the detection resistor connected to the terminal of the coil becomes larger. Referring to FIG. 15, in the second detection mode in the case where the recovery pulse RP is output, the detection resistor is switched to a detection resistor having a high resistance, and the absolute values of rotation detection pulses V9 and V10 in part (b) of FIG. 15 are increased to facilitate the detection. In addition, both the above-mentioned switching of the threshold value and the changing of the resistance value of the detection resistor may be performed at the same time. Note that the circuit for changing the detection sensitivity is hereinafter referred to as sensitivity setting circuit.

Figure 16:
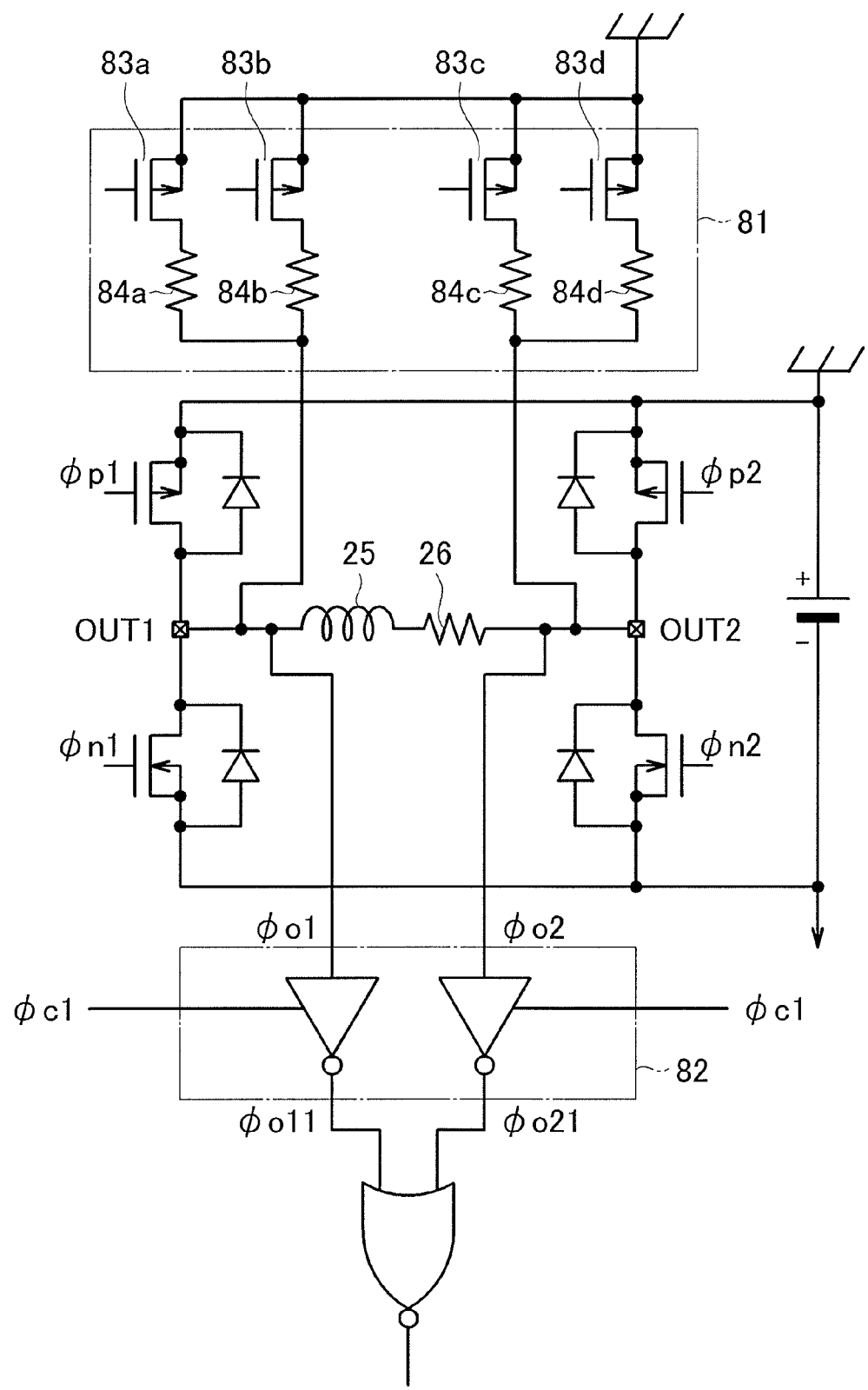
FIG. 16 A diagram illustrating an example of a sensitivity setting circuit for changing a threshold voltage by switching a detection resistor.

FIG. 16 is a diagram illustrating an example of the sensitivity setting circuit for changing the detection sensitivity by switching the detection resistor to change the detection resistor. In FIG. 16, reference numeral 81 denotes a detection resistor switch circuit, and reference numeral 82 denotes a comparator circuit.

In the detection resistor switch circuit 81, detection resistors 84a to 84d are connected via PMOS transistors 83a to 83d, respectively. As illustrated in FIG. 16, the detection resistors 84a and 84b are connected in parallel to the terminal OUT1 and the detection resistors 84c and 84d are connected in parallel to the terminal OUT2. The detection resistors 84a and 84b and the detection resistors 84c and 84d have different resistance values. In this example, the resistance value of the detection resistors 84b and 84d is larger than the resistance value of the detection resistors 84a and 84c. Accordingly, the detection sensitivity determined when the detection resistor 84b or 84d is selected is higher than the detection sensitivity determined when the detection resistor 84a or 84c is selected.

In this example, through appropriate switching of the PMOS transistors 83a to 83d, the detection resistors 84a to 84d to be used for rotation detection can be switched to thereby change the detection sensitivity. For example, referring to the example shown in FIG. 15, in the first detection mode, the PMOS transistor 83c is turned ON in order to select the detection resistor 84c for the voltage detection on terminal OUT2 side. Similarly, in the second detection mode where the recovery pulse RP is output, the PMOS transistor 83b is turned ON in order to select the detection resistor 84b for the voltage detection on the terminal OUT1 side. In this way, the detection sensitivity becomes higher. If the recovery pulse RP is not output, the PMOS transistor 83a is turned ON in order to select the detection resistor 84a in the second detection mode. Even in the case where the polarities between the terminals are reversed, the detection sensitivity is selected similarly.

The comparator circuit 82 has a configuration in which comparators are provided correspondingly to the terminals OUT1 and OUT2, respectively, and the threshold voltage is switched by the control signal φc1 supplied from a control line. Note that if it is not necessary to switch the threshold voltage of the comparators, the threshold voltage may be fixed and the illustrated control line may be omitted.

In addition, in each embodiment described above, the recovery pulse may be output in the case where the duty ratio of the drive pulse matches a stable duty ratio which is a duty ratio determined in advance in accordance with the power supply voltage.

As described above, as the duty ratio of the drive pulse, the lowest duty ratio needed to rotate the rotor normally is automatically selected and output. This duty ratio is referred to as stable duty ratio, and is determined based on the power supply voltage at the time of driving the rotor, based on the load to be driven by the rotor such as the mass and shape of a mechanism of a hand or the like, and based on the configuration of the motor such as the rotor and the coil. It is therefore possible to obtain a stable duty ratio corresponding to the power supply voltage experimentally in advance at the design phase or the trial phase of the electronic watch. Note that the number of the stable duty ratios is not limited to one, and a plurality of stable duty ratios may be prepared in accordance with the reduction in power supply voltage caused by the driving of the electronic watch. The number of stable duty ratios is not particularly limited. However, about two to five stable duty ratios appear in the use of a general electronic watch, and accordingly it is preferred to obtain about two to five stable duty ratios in advance. In each embodiment of the present invention, the number of stable duty ratios is four.

FIG. 17 is a flowchart for control of outputting a recovery pulse in the case where the duty ratio of the drive pulse is a stable duty ratio.

First, in Step S1, the current power supply voltage of the electronic watch is detected. In this detection, the detection result of the power supply voltage detection circuit 7 in FIG. 6 can be used. Subsequently, in Step S2, a stable duty ratio which is experimentally obtained in advance is selected in accordance with the detected power supply voltage. Then, in Step S3, it is determined whether or not the current time is a time for moving the indicating hand, that is, whether or not the current time is on the second. When the current time is the time for moving the indicating hand, the flow proceeds to subsequent Step S4. Otherwise, the flow stands by until the time for moving the hand arrives.

In Step S4, the motor drive pulse is output to rotate the stepper motor 4. At this time, the drive pulse has a duty ratio determined by the above-mentioned method. That is, the duty ratio is selected under such control that the duty ratio is decreased when it is continuously detected for a given period that the rotor has rotated normally while the duty ratio is increased when it is detected that the rotor has not rotated.

In Step S5, it is determined whether or not the current time is the time of outputting the recovery pulse. At this time, the time of outputting the recovery pulse can be determined in accordance with the design of the electronic watch. For example, as in the above-mentioned first embodiment, a time at which the induced current approached the peak may be determined experimentally in advance and may be set as the time of outputting the recovery pulse. Alternatively, as in the above-mentioned second embodiment, the time of outputting the recovery pulse may be different depending on the detection result of the power supply voltage. Still alternatively, as in the above-mentioned fourth embodiment, the recovery pulse may be output after the end of the rotation detection in the first detection mode. When the current time is the time of outputting the recovery pulse, the flow proceeds to subsequent Step S6. Otherwise, the flow stands by until such a time arrives.

In Step S6, the stable duty ratio selected in Step S2 and the currently-selected duty ratio of the drive pulse are compared with each other. When the two duty ratios are equal to each other, the flow proceeds to Step S7, and the recovery pulse is output. On the other hand, when it is determined in Step S6 that the two duty ratios are not equal to each other, the recovery pulse is not output.

This configuration realizes highly-efficient electric power recovery over a wide range of varying power supply voltage. At the same time, the adverse influence caused by the output of a recovery pulse, such as the possibility of an erroneous determination in rotation detection, can be reduced because the recovery pulse is output only when a stable operation is performed.

As an example, in the above-mentioned first embodiment, in the case where the control for outputting a recovery pulse when the duty ratio of the drive pulse was a stable duty ratio was performed by setting the stable duty ratio to duty ratios of 22/32, 23/32, 24/32, and 25/32, power consumption could be reduced by about 5% to 6% compared with the case of not using this setting. Note that the expression n/m representing the duty ratio indicates that the period during which the drive pulse is actually output is n with respect to an entire length m of the period during which the drive pulse can be output.

The embodiments of the present invention have exemplified the operation of the stepper motor that advances the second hand by one second with each operation. It should be noted, however, that the present invention is also applicable to the case of quickly advancing the second hand, such as adjusting seconds or realizing other such functions. The block diagrams, the circuit component configurations, and the timing charts disclosed herein are not to be construed as limitations, and any modifications are possible within the range not departing from the gist of the present invention.

The invention claimed is:

1. An electronic watch, comprising:
   a power source;
   a stepper motor for driving an indicator;
   a motor driver for driving the stepper motor;
   a motor control circuit for outputting a control signal for controlling the stepper motor to the motor driver;
   a drive pulse output circuit for outputting a drive pulse for driving the stepper motor to the motor driver; and
   a recovery pulse output circuit for outputting, in a vicinity of a peak position of a waveform of an induced current resulting from free oscillation of a rotor of the stepper motor after the output of the drive pulse, a recovery pulse having such a level that the rotor does not rotate,
   wherein the motor control circuit outputs the drive pulse and the recovery pulse in a switching manner so that electric power of the induced current is regenerated into the power source when the recovery pulse is output,
   further comprising:
   a rotation detection pulse output circuit for outputting a rotation detection pulse used for detecting the waveform of the induced current to the stepper motor control circuit;
   a rotation detection circuit for determining presence or absence of rotation of the stepper motor based on the waveform of the induced current detected by the rotation detection pulse; and
   an adjustment circuit for controlling operations of the rotation detection pulse output circuit and the recovery pulse output circuit in order to prevent an erroneous determination on the presence or absence of the rotation performed by the rotation detection circuit.

2. The electronic watch according to claim 1, wherein:
   the rotation detection pulse output circuit outputs a first detection pulse for detecting an induced current waveform having the same polarity as a polarity of a current waveform generated by the drive pulse, and a second detection pulse for detecting an induced current waveform having a polarity opposite to the polarity of the current waveform generated by the drive pulse, the second detection pulse being output after the first detection pulse; and
   the adjustment circuit controls the recovery pulse output circuit so as to output the recovery pulse after the detection by the first detection pulse has been finished, and controls the rotation detection pulse output circuit so as to start outputting the second detection pulse after a predetermined period has elapsed.

3. The electronic watch according to claim 1, wherein:

the rotation detection pulse output circuit outputs a preliminary detection pulse for performing preliminary detection of preliminarily detecting the presence or absence of the rotation of the stepper motor, and outputs a main detection pulse for performing main detection of detecting the presence or absence of the rotation of the stepper motor after the preliminary detection; and the adjustment circuit inhibits an output of the recovery pulse from the recovery pulse output circuit when the rotation detection circuit detects, in the preliminary detection, that the stepper motor has not rotated.

4. The electronic watch according to claim 1, wherein:

the rotation detection circuit comprises a sensitivity setting circuit for changing detection sensitivity with respect to the waveform of the induced current; and the adjustment circuit controls the sensitivity setting circuit so as to increase the detection sensitivity when the recovery pulse is output from the recovery pulse output circuit.

5. The electronic watch according to claim 1, wherein the adjustment circuit controls the rotation detection pulse output circuit so as to output the recovery pulse when a duty ratio of the drive pulse is equal to a stable duty ratio which is determined in advance in accordance with a power supply voltage of the power source.

* * * * *